United States Patent
Yamamoto

(10) Patent No.: US 12,307,343 B2
(45) Date of Patent: May 20, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tatsuya Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 597 days.

(21) Appl. No.: 17/156,267

(22) Filed: Jan. 22, 2021

(65) Prior Publication Data

US 2021/0142484 A1 May 13, 2021

Related U.S. Application Data

(63) Continuation of application No. PCT/JP2019/028464, filed on Jul. 19, 2019.

(30) Foreign Application Priority Data

Jul. 27, 2018 (JP) .................................. 2018-141430
May 24, 2019 (JP) .................................. 2019-097874

(51) Int. Cl.
  *G06T 7/11* (2017.01)
  *G06N 20/00* (2019.01)
  (Continued)

(52) U.S. Cl.
  CPC .............. *G06N 20/10* (2019.01); *G06N 20/00* (2019.01); *G06T 7/11* (2017.01); *G06T 7/73* (2017.01); *G06T 7/97* (2017.01); *G06V 10/762* (2022.01); *G06V 10/774* (2022.01); *G06V 20/20* (2022.01); *G06V 20/52* (2022.01);
  (Continued)

(58) Field of Classification Search
  CPC ...... G06N 20/10; G06N 20/00; G06V 10/762; G06V 10/774; G06V 20/20; G06V 20/52; G06V 20/68; G05T 7/11; G05T 7/97; G05T 7/73; G06F 18/23; G06T 2207/20132; G06T 2207/20081; G06T 2207/30242; G06T 2207/30188
  See application file for complete search history.

(56) References Cited

U.S. PATENT DOCUMENTS

2016/0171680 A1* 6/2016 Lobell ..................... G06T 7/00 382/110
2017/0228475 A1* 8/2017 Aldor-Noiman ....... G06Q 10/06
2018/0158207 A1* 6/2018 Germain .................. G06T 7/62

FOREIGN PATENT DOCUMENTS

JP   2012108785 A   6/2012
JP   2017077238 A   4/2017

OTHER PUBLICATIONS

Bargoti, Suchet, and James Underwood. "Image Segmentation for Fruit Detection and Yield Estimation in Apple Orchards." arXiv preprint arXiv:1610.08120 (2016). (Year: 2016).*

(Continued)

*Primary Examiner* — Vu Le
*Assistant Examiner* — Tracy Mangialaschi
(74) *Attorney, Agent, or Firm* — Canon U.S.A., Inc. IP Division

(57) ABSTRACT

An estimation parameter for estimating the actual number of target objects in a designated region of a field is learned using a feature amount acquired from a captured image of a set region of the field and the actual number of target objects in the set region as learning data.

9 Claims, 21 Drawing Sheets

(51) Int. Cl.
*G06N 20/10* (2019.01)
*G06T 7/00* (2017.01)
*G06T 7/73* (2017.01)
*G06V 10/762* (2022.01)
*G06V 10/774* (2022.01)
*G06V 20/20* (2022.01)
*G06V 20/52* (2022.01)
*G06V 20/68* (2022.01)

(52) U.S. Cl.
CPC ............... *G06T 2207/20081* (2013.01); *G06T 2207/20132* (2013.01); *G06T 2207/30188* (2013.01); *G06T 2207/30242* (2013.01); *G06V 20/68* (2022.01)

(56) References Cited

OTHER PUBLICATIONS

McCarthy, Alison, Carolyn Hedley, and Ahmed El-Naggar. "Machine vision for camera-based horticulture crop growth monitoring." PA17—The International Tri-Conference for Precision Agriculture in 2017: book of abstracts. University of Southern Queensland, 2017. (Year: 2017).*

Nuske, Stephen, et al. "Modeling and calibrating visual yield estimates in vineyards." Field and service robotics: Results of the 8th international conference. Springer Berlin Heidelberg, 2014. (Year: 2014).*

* cited by examiner

FIG.3

| ID | IMAGE FILE | NUMBER OF DETECTED TARGETS | ACTUAL NUMBER |
|---|---|---|---|
| 1 | IMG_0001.jpg | 3 | 7 |
| 2 | IMG_0002.jpg | 3 | 9 |
| 3 | IMG_0003.jpg | 4 | 9 |
| 4 | IMG_0004.jpg | 5 | 12 |
| ⋮ | | | |
| 631 | IMG_0631.jpg | 11 | 21 |
| 632 | IMG_0632.jpg | 8 | 19 |
| 633 | IMG_0633.jpg | 11 | 20 |
| 634 | IMG_0634.jpg | 9 | 19 |

| ID | IMAGE FILE | NUMBER OF DETECTED TARGETS | ESTIMATED VALUE | |
|---|---|---|---|---|
| 1 | IMG_0001.jpg | 3 | 10.6 | ~401 |
| 2 | IMG_0002.jpg | 4 | 11.8 | |
| 3 | IMG_0003.jpg | 2 | 9.4 | |
| 4 | IMG_0004.jpg | 5 | 13 | |
| 5 | IMG_0005.jpg | 4 | 11.8 | |
| 6 | IMG_0006.jpg | 4 | 11.8 | |
| 7 | IMG_0007.jpg | 5 | 13 | |
| ⋮ | | | | |
| 835 | IMG_1835.jpg | 10 | 19 | |
| 836 | IMG_1836.jpg | 6 | 14.2 | |
| 837 | IMG_1837.jpg | 11 | 20.2 | |
| 838 | IMG_1838.jpg | 8 | 16.6 | |

FIG.11

| ID | IMAGE FILE | NUMBER OF DETECTED TARGETS | NUMBER OF DETECTED TARGETS IN NEIGHBORHOODS | SOIL | AMOUNT OF LEAVES | ACTUAL NUMBER |
|---|---|---|---|---|---|---|
| 1 | IMG_0001.jpg | 3 | 3 | -1 | -1 | 7 |
| 2 | IMG_0002.jpg | 3 | 3.5 | -1 | 0 | 9 |
| 3 | IMG_0003.jpg | 4 | 4 | -1 | 0 | 9 |
| 4 | IMG_0004.jpg | 5 | 4.5 | 0 | 0 | 12 |
| ⋮ | | | | | | |
| 631 | IMG_0631.jpg | 11 | 9 | 1 | 0 | 21 |
| 632 | IMG_0632.jpg | 8 | 11 | 1 | 1 | 19 |
| 633 | IMG_0633.jpg | 11 | 8.5 | 1 | 0 | 20 |
| 634 | IMG_0634.jpg | 9 | 11 | 1 | 0 | 19 |

| ID | IMAGE FILE | NUMBER OF DETECTED TARGETS | NUMBER OF DETECTED TARGETS IN NEIGHBORHOODS | SOIL | AMOUNT OF LEAVES | ESTIMATED VALUE |
|---|---|---|---|---|---|---|
| 1 | IMG_0001.jpg | 3 | 4 | -1 | -1 | 8.3 |
| 2 | IMG_0002.jpg | 4 | 2.5 | -1 | 0 | 9.5 |
| 3 | IMG_0003.jpg | 2 | 4.5 | -1 | 0 | 9.1 |
| 4 | IMG_0004.jpg | 5 | 3 | 0 | 0 | 11.1 |
| 5 | IMG_0005.jpg | 4 | 4.5 | 0 | 0 | 12.1 |
| 6 | IMG_0006.jpg | 4 | 4.5 | 0 | 1 | 13.3 |
| 7 | IMG_0007.jpg | 5 | 5 | 0 | 0 | 13 |
| ⋮ | | | | | | |
| 835 | IMG_1835.jpg | 10 | 8 | 1 | 0 | 19.6 |
| 836 | IMG_1836.jpg | 6 | 10.5 | 1 | 1 | 19.3 |
| 837 | IMG_1837.jpg | 11 | 7 | 1 | 0 | 19.8 |
| 838 | IMG_1838.jpg | 8 | 11 | 1 | 0 | 19.7 |

FIG.16

| YEAR | MEAN VALUE OF NUMBER OF DETECTED TARGETS | PARAMETER |
|---|---|---|
| 2012 | 13.9 | $w_0 = 7.0, w_1 = 1.2$ |
| 2013 | 15.3 | $w_0 = 7.2, w_1 = 1.3$ |
| ⋮ | ⋮ | ⋮ |
| 2017 | 12.3 | $w_0 = 6.9, w_1 = 1.1$ |

~1601

| PROPORTION OF SUNNY DAYS | COEFFICIENT |
|---|---|
| LESS THAN 0.4 | 0.9 TIMES |
| LESS THAN 0.6 | 10 TIMES |
| 0.6 OR MORE | 1.1 TIMES |

~1602

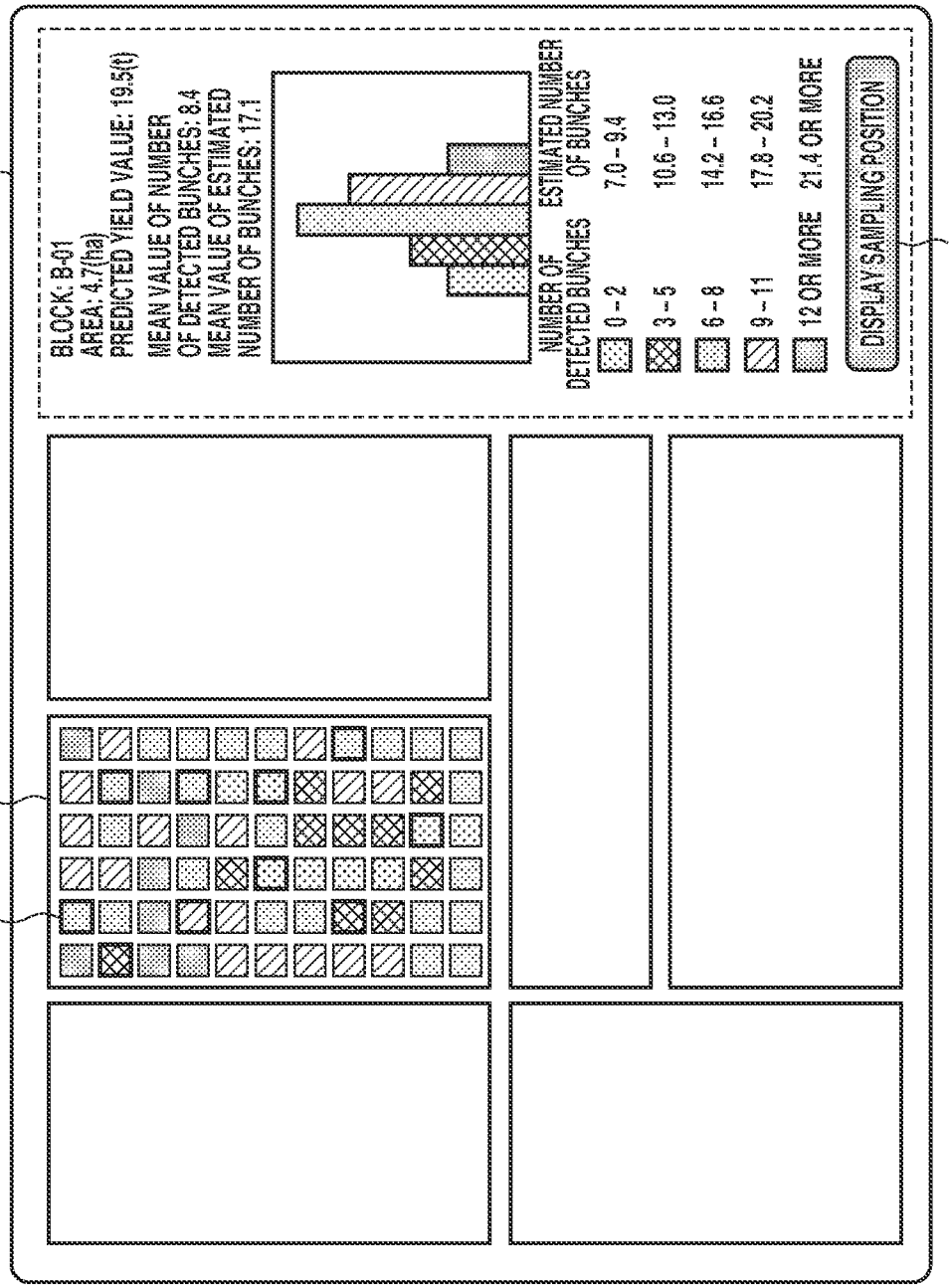

INFORMATION PROCESSING APPARATUS, INFORMATION PROCESSING METHOD, AND STORAGE MEDIUM

CROSS-REFERENCE TO RELATED APPLICATIONS

This application is a Continuation of International Patent Application No. PCT/JP2019/028464, filed Jul. 19, 2019, which claims the benefit of Japanese Patent Applications No. 2018-141430, filed Jul. 27, 2018, and No. 2019-097874, filed May 24, 2019, all of which are hereby incorporated by reference herein in their entirety.

BACKGROUND OF THE INVENTION

Field of the Invention

The present invention relates to an information processing apparatus, an information processing method, and a storage medium.

Background Art

There is a technique for calculating the number of specific objects in a specific region.

For example, Patent Document (PLT) 1 discusses a method in which a flower region is detected from a captured image using an image processing technique and the number of flowers is calculated. Further, use of a partial detector discussed in Patent Document (PLT) 2 enables detection of an object even in a case where the object is partly hidden (e.g., a case where a crop that is an object is partly behind leaves, and the like). Thus, the number of objects is calculated with great accuracy even in a case where the objects are partly hidden.

However, there are cases where an object to be counted is difficult to detect. For example, in a case where an object is completely hidden (e.g., a case where a crop that is an object is completely behind leaves), the object cannot be detected by the techniques discussed in PLTs 1 and 2.

CITATION LIST

Patent Literature

PTL 1: Japanese Patent Laid-Open No. 2017-77238
PTL 2: Japanese Patent Laid-Open No. 2012-108785

There are demands for assisting in realizing a mechanism of estimating the total number of objects even in a case where an object to be counted is partly or entirely undetectable.

However, PLTs 1 and 2 cannot assist in realizing such a mechanism.

SUMMARY OF THE INVENTION

According to an aspect of the present invention, an information processing apparatus includes a feature acquisition unit configured to acquire a feature relating to the number of target objects detected from a first image, a selection unit configured to select an estimation parameter based on an index associated with an image capturing target of the first image from among a plurality of estimation parameters that is learned in association with a different index value based on the number of target objects detected by predetermined detection processing from a captured image of a region that is a portion of a field in which a crop is grown and the actual number of target objects, and an estimation unit configured to estimate the number of target objects in a region corresponding to the first image, based on the estimation parameter selected by the selection unit and the feature.

Further features of the present invention will become apparent from the following description of exemplary embodiments with reference to the attached drawings.

BRIEF DESCRIPTION OF THE DRAWINGS

FIG. 3 is a diagram illustrating an example of a table that manages learning data.
FIG. 5 is a diagram illustrating an example of a table that manages estimation data.
FIG. 11 is a diagram illustrating an example of a table that manages learning data.
FIG. 12 is a diagram illustrating an example of a table that manages estimation data.
FIG. 16 is a diagram illustrating an example of a table that manages correction information.
FIG. 21 is a diagram illustrating an example of an estimation result display screen.

DESCRIPTION OF THE EMBODIMENTS

Various exemplary embodiments of the present invention will be described in detail below with reference to the drawings.

First Exemplary Embodiment

In the present exemplary embodiment, a process in which an estimation apparatus 100 learns an estimation parameter for use in estimating the number of objects in a designated region and estimates the number of objects in the designated region based on the learned estimation parameter will be described below.

Figure 1:
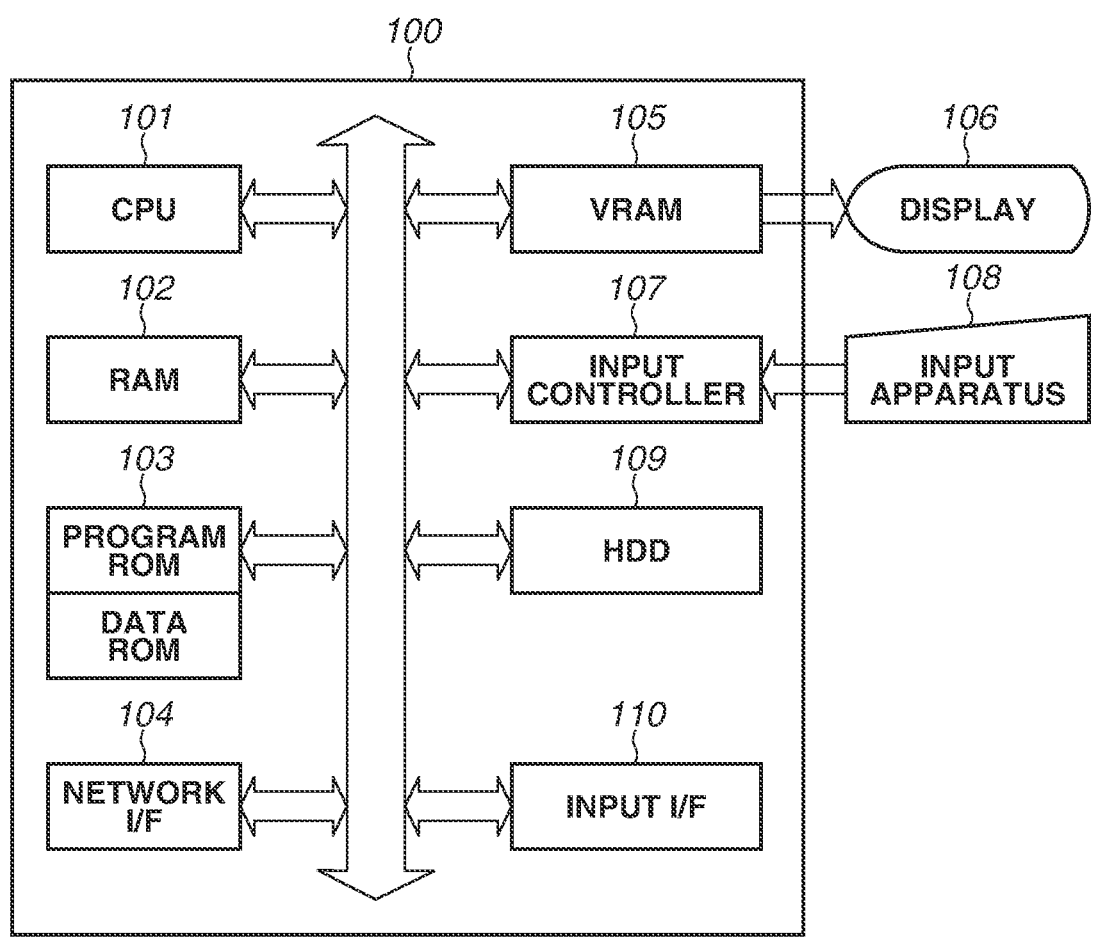
FIG. 1 is a diagram illustrating an example of a hardware configuration of an estimation apparatus.

FIG. 1 is a diagram illustrating an example of a hardware configuration of the estimation apparatus 100 according to the present exemplary embodiment. The estimation apparatus 100 is an information processing apparatus, such as a personal computer, a server apparatus, or a tablet apparatus, that estimates the number of objects in a designated region.

The estimation apparatus 100 includes a central processing unit (CPU) 101, a random access memory (RAM) 102, a read-only memory (ROM) 103, a network interface (network I/F) 104, a video RAM (VRAM) 105, an input controller 107, a hard disk drive (HDD) 109, and an input interface (input I/F) 110. The foregoing components are connected to one another via a system bus 111 to communicate with each other.

The CPU 101 is a central processing unit that comprehensively controls the entire estimation apparatus 100. The RAM 102 is a random access memory and functions as a main memory of the CPU 101 and a work memory for loading an execution program and executing a program.

The ROM 103 is a read-only memory and stores, for example, various programs and various types of settings information. The ROM 103 includes a program ROM storing an operating system (OS) that is a system program configured to control devices of a computer system, and a data ROM storing information for operating the system. Further, the HDD 109 can store the programs and information that are stored in the ROM 103.

The network I/F 104 is a network interface used to control input and output of data, for example, image data transmitted and received via a network, such as a local area network (LAN). The network I/F 104 is a wired or wireless interface corresponding to a network medium.

The VRAM 105 is a video RAM, and image data to be displayed on a screen of a display 106, which is a display apparatus, is developed to the VRAM 105. The display 106 is a display apparatus, such as a liquid crystal display or a liquid crystal panel. The input controller 107 is a controller for use in controlling input signals from an input apparatus 108. The input apparatus 108 is an external input apparatus for receiving operation instructions from a user, such as a touch panel, a keyboard, a pointing device, and a remote controller.

The HDD 109 is a hard disk drive and stores application programs and data, such as moving image data and image data. The application programs stored in the HDD 109 are, for example, a highlight moving image generation application. The input I/F 110 is an interface for use in connecting to an external apparatus, such as a compact disk (CD) (digital versatile disk (DVD))-ROM drive or a memory card drive, and is used to read, for example, image data captured by a digital camera. The system bus 111 is an input/output bus that connects the hardware components of the estimation apparatus 100 to communicate with each other, and is an address bus, a data bus, or a control bus, for example.

The CPU 101 executes processing based on a program stored in the ROM 103 or the HDD 109 to realize functions of the estimation apparatus 100 that will be described below with reference to FIGS. 2, 8, and 15 and processes illustrated in flowcharts in FIGS. 6, 7, 13, 14, and 17 described below.

In the present exemplary embodiment, a number estimation target object is a crop (e.g., fruit, flower, bunch of grapes). Hereinafter, the number estimation target object will be referred to as a target object. Further, in the present exemplary embodiment, an object that can hinder detection of the target object will be referred to as a hindrance. In the present exemplary embodiment, the hindrance is a leaf. Alternatively, the hindrance can be not only a leaf but also a tree or a stem. Further, the target object is not limited to crops and can be a person or a vehicle. In this case, the hindrance can be, for example, a building.

Further, in the present exemplary embodiment, the estimation apparatus 100 detects the target object from a captured image of a region that is a target of the estimation of the number of target objects and calculates a feature amount indicating a feature of the region that is determined based on the number of detected target objects. Based on the acquired feature amount and the number of target objects that are actually in the region, the estimation apparatus 100 learns an estimation parameter that is a parameter for use in estimating the actual number of target objects in the region. Hereinafter, the actual number of target objects that are in a region will be referred to as the actual number of target objects in the region.

Further, the estimation apparatus 100 detects the target object from a captured image of a designated region that is a target of the estimation of the number of target objects, and the estimation apparatus 100 calculates a feature amount indicating a feature of the region based on the number of detected target objects. Then, the estimation apparatus 100 estimates the actual number of target objects in the region based on the acquired feature amount and the learned estimation parameter.

Figure 2:
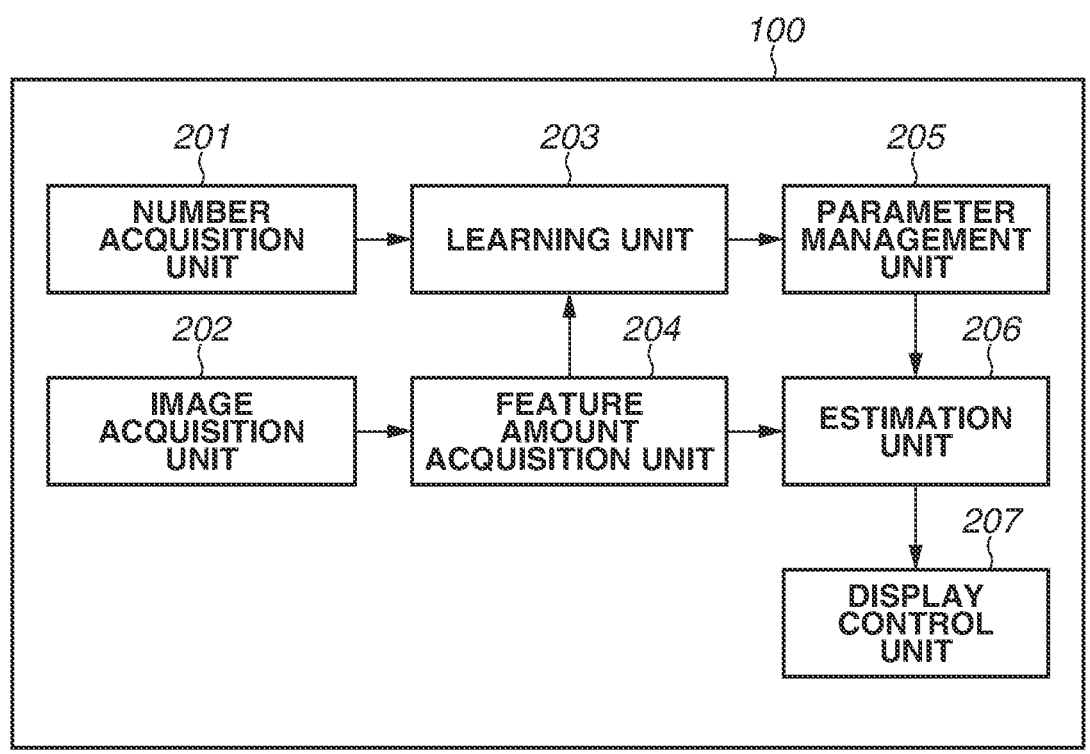
FIG. 2 is a diagram illustrating an example of a functional configuration of the estimation apparatus.

FIG. 2 is a diagram illustrating an example of a functional configuration of the estimation apparatus 100 according to the present exemplary embodiment. The estimation apparatus 100 includes a number acquisition unit 201, an image acquisition unit 202, a learning unit 203, a feature amount acquisition unit 204, a parameter management unit 205, an estimation unit 206, and a display control unit 207.

The number acquisition unit 201 acquires the actual number of target objects in a preset region that is acquired by manual counting. The number acquisition unit 201 acquires the actual number by, for example, reading a text file recording the actual number of target objects in the preset region from the HDD 109. Further, the number acquisition unit 201 can receive input of the actual number via the input apparatus 108.

The image acquisition unit 202 acquires a captured image of the preset region containing target objects from, for example, an external image capturing apparatus and stores the acquired image in the HDD 109. In the present exemplary embodiment, each preset region is an entire region captured in the corresponding image.

The feature amount acquisition unit 204 detects the target object using an object detection technique from the image acquired by the image acquisition unit 202 and acquires a feature amount based on the number of detected target objects. The feature amount indicates a feature of the preset region where the detected target objects are. Hereinafter, the number of target objects detected from a region by the feature amount acquisition unit 204 will be referred to as the number of detected targets in the region. In the present exemplary embodiment, the feature amount acquisition unit 204 acquires the number of detected targets in a region as a feature amount indicating a feature of the region. The processing of acquiring a feature amount by the feature amount acquisition unit 204 is an example of feature acquisition processing.

The learning unit 203 performs the following processing on each image received by the number acquisition unit 201. Specifically, the learning unit 203 acquires the actual number of target objects in the preset region corresponding to the image acquired by the number acquisition unit 201 and the feature amount indicating the feature of the preset region corresponding to the image acquired by the feature amount acquisition unit 204. Then, the learning unit 203 performs machine learning based on the acquired number and the acquired feature amount and learns an estimation parameter for use in estimating the actual number of target objects in a designated region. In the present exemplary embodiment, linear regression is used as a technique for the machine learning, and the learning unit 203 learns a parameter for use in linear regression as an estimation parameter. Alternatively, the learning unit 203 can learn a parameter in another method, such as a support vector machine, as an estimation parameter.

The parameter management unit 205 stores the estimation parameter learned by the learning unit 203 in the HDD 109 or the like and manages the estimation parameter.

The estimation unit 206 performs the following processing based on the feature amount acquired by the feature amount acquisition unit 204 from the captured image of the region that is a target of the estimation of the number of target objects and the learned estimation parameter managed by the parameter management unit 205. Specifically, the estimation unit 206 estimates the actual number of target objects in the region that is a target of the estimation of the number of target objects.

FIG. 3 is a diagram illustrating an example of a table for managing the actual number of target objects acquired by the number acquisition unit 201 and the number of target objects detected by the feature amount acquisition unit 204 as learning data. A table 301 contains items "identification" (1D), "image file", "number of detected targets", and "actual number". The item "ID" specifies identification information that identifies learning data. The item "image file" specifies an image used to generate the corresponding learning data. The item "number of detected targets" specifies the number of target objects detected from the image specified by the associated item "image file". The item "actual number" specifies the number of target objects that are actually in a specific region captured in the image specified by the associated item "image file" (e.g., the number of target objects including those that are hidden by leaves and are thus not shown in the image). The table 301 is stored in, for example, the HDD 109.

Figure 4:
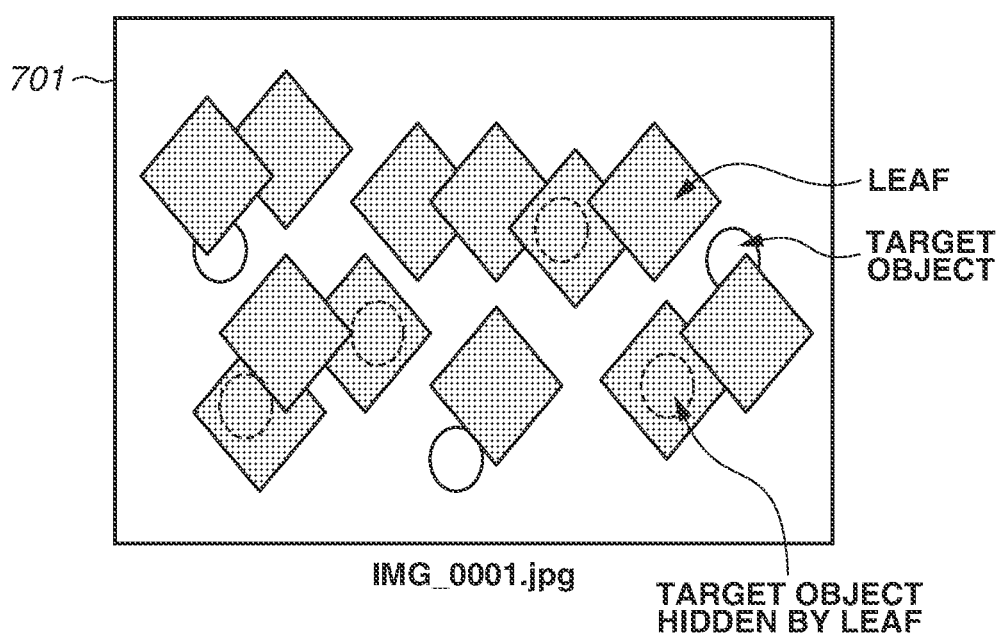
FIG. 4 is a diagram illustrating an example of a state where objects are partly hidden by leaves.

An image of the image file (IMG_0001.jpg) associated with the learning data of an ID 1 will be described below as an example with reference to FIG. 4. From observation of an image 701 of IMG_0001.jpg, it is understood that three target objects are captured while four target objects are hidden and are thus not shown. Therefore, the number of detected targets and the actual number that are associated with the learning data of the ID 1 in the table 301 are respectively 3 and 7 (=3+4).

The number acquisition unit 201 acquires the actual number of target objects in one or more specific regions in advance. Further, the feature amount acquisition unit 204 detects the target object from each of a plurality of captured images of any of the one or more specific regions in advance and calculates the number of detected targets. Then, the number acquisition unit 201 and the feature amount acquisition unit 204 store the acquired actual number and the acquired number of detected targets as learning data in the form of the table 301 in FIG. 3 in, for example, the HDD 109. In this way, the learning data for use in learning is prepared in advance.

The image file or the feature amount included in the learning data in the present exemplary embodiment is referred to as input data. The actual number associated with the input data is referred to as ground truth data. Further, the learned estimation parameter is also referred to as a learned model.

FIG. 5 is a diagram illustrating an example of a table that manages the number of target objects detected by the feature amount acquisition unit 204 from a captured image of a region that is a target of the estimation of the actual number of target objects and the value of the actual number of target objects in the region that is estimated by the estimation unit 206. A table 401 contains items "ID", "image file", "number of detected targets", and "estimated value". The item ID specifies identification information that identifies the region for which the actual number of target objects is estimated. The item "image file" specifies the image that is used to estimate the actual number. The item "number of detected targets" specifies the number of target objects detected by the feature amount acquisition unit 204 from the image identified by the associated item "image file" (the number of detected targets). The item "estimated value" specifies the number of target objects that is estimated by the estimation unit 206. The table 401 is stored in, for example, the HDD 109.

Figure 6:
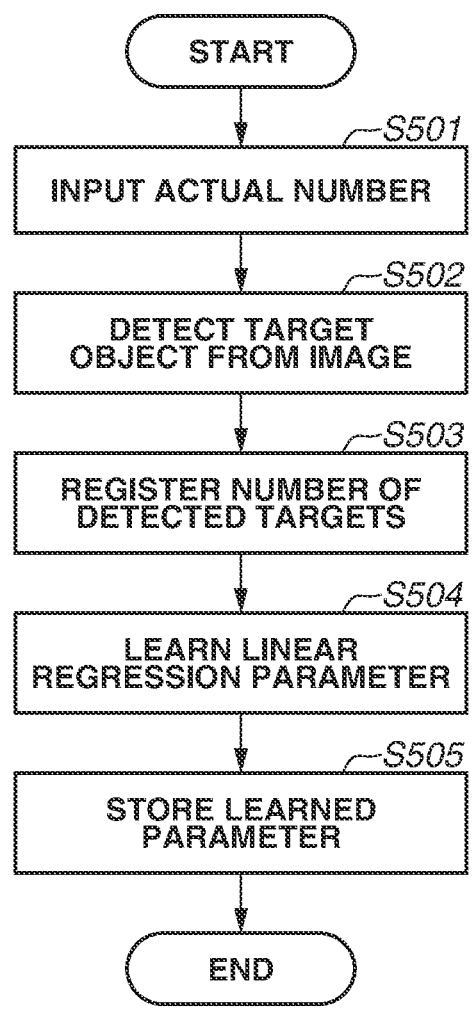
FIG. 6 is a flowchart illustrating an example of a learning process.

FIG. 6 is a flowchart illustrating an example of an estimation parameter learning process.

In step S501, the number acquisition unit 201 acquires, for example, a file name of an image file of a captured image of a preset region and the actual number of target objects in the region from the text file stored in the HDD 109. Then, the number acquisition unit 201 registers the acquired file name and the acquired actual number in the table 301 stored in the HDD 109. In the HDD 109, the text file in which the file name of the image file and the actual number are recorded in association in a comma-separated values (CSV) format is stored in advance.

In the present exemplary embodiment, the number acquisition unit 201 acquires the file name of the image file of each of the plurality of preset regions and the actual number of target objects in each region from the text file stored in the HDD 109. Then, the number acquisition unit 201 registers each combination of the acquired file name and the acquired actual number of each of the plurality of regions in the table 301.

In step S502, the feature amount acquisition unit 204 detects the target object from each image identified by the image file names registered in the table 301 in step S501 and acquires the number of detected targets as a feature amount of the region captured in the image.

In step S503, the feature amount acquisition unit 204 registers, for example, the number of detected targets (feature amount) that is acquired in step S502 in the table 301 stored in the HDD 109.

In step S504, the learning unit 203 learns an estimation parameter (which is a linear regression parameter in the present exemplary embodiment) using the combination of the number of detected targets (feature amount) and the actual number that are registered in the table 301. The linear regression is expressed by, for example, the formula (1) below. The learning unit 203 learns, for example, parameters $w0$ and $w1$ in formula (1) as estimation parameters. For example, values such as $w0=7.0$ and $w1=1.2$ are learned.

$$\text{Actual number(estimated value)} = w0 + (w1 \times \text{the number of detected targets}) \quad \text{formula (1).}$$

In step S505, the parameter management unit 205 starts management by, for example, storing the estimation parameters learned in step S504 in the HDD 109.

Figure 7:
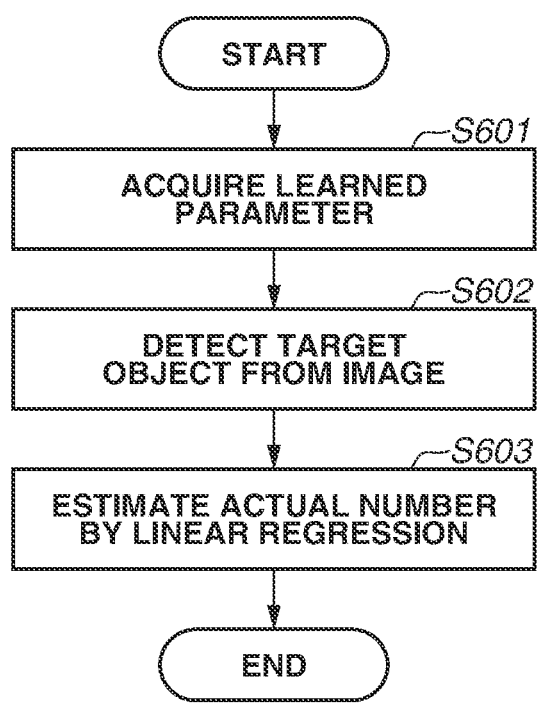
FIG. 7 is a flowchart illustrating an example of an estimation process.

FIG. 7 is a flowchart illustrating an example of an estimation process using the estimation parameters learned in FIG. 6.

In step S601, the estimation unit 206 requests the estimation parameters learned in the process in FIG. 6 from the parameter management unit 205. In response to the request, the parameter management unit 205 acquires the estimation parameters learned in step S504 and stored in step S505 from the HDD 109 and transmits the acquired estimation parameters to the estimation unit 206.

In step S602, the feature amount acquisition unit 204 detects the target object from a captured image of a region designated as a target of the estimation of the number of target objects and acquires the number of detected targets. In the present exemplary embodiment, inputting a captured image of at least a portion of a field as a processing target in step S602 is equivalent to designating the region captured in the image as a target of the estimation of the number of target objects. In a case where a plurality of images is designated, all the images are processed similarly. Then, the feature amount acquisition unit 204, for example, registers the acquired number of detected targets in association with the image file name of the image in the table 401 stored in the HDD 109.

In step S603, the estimation unit 206 estimates the number of target objects in the region that is a target of the estimation of the number of target objects based on the estimation parameters acquired in step S601 and the number of detected targets that is acquired in step S602. The estimation unit 206, for example, calculates an estimated value of the number of target objects in the region using formula (1) based on the estimation parameters w0 and w1 acquired in step S601 and the number of detected targets that is acquired in step S602. The estimation unit 206 outputs the calculated estimated value by registering the estimated value in the table 401. Further, the estimation unit 206 can output the calculated estimated value by displaying the estimated value on the display 106.

The estimated value registered in the table 401 is for use in, for example, predicting a yield of a crop that is the target object and visualizing information about regions predicted to have a high yield and regions predicted to have a low yield on a map.

As described above, in the present exemplary embodiment, the estimation apparatus 100 detects the target object from the captured image of the preset region and acquires the feature amount indicating a feature of the region based on the number of detected target objects (the number of detected targets). Then, the estimation apparatus 100 learns the estimation parameters based on the acquired feature amount and the actual number of target objects (actual number) in the region. Use of the learned estimation parameters makes it possible to estimate the actual number of target objects in a region based on the feature amount associated with the number of target objects detected from the region. Specifically, the estimation apparatus 100 learns the estimation parameters to assist in realizing a mechanism of estimating the total number of objects even in a case where the target object is partly or entirely undetectable.

Further, in the present exemplary embodiment, the estimation apparatus 100 performs the following processing based on the learned estimation parameters and the feature amount of the region that is acquired based on the number of target objects detected from the captured image of the region that is a target of the estimation of the number of target objects. Specifically, the estimation apparatus 100 estimates the actual number of target objects in the region. The estimation apparatus 100 estimates the actual number of target objects in a region from the feature amount of the region that is based on the number of target objects detected from the region. This enables the estimation apparatus 100 to assist in realizing a mechanism of estimating the total number of objects even in a case where the target object is partly or entirely undetectable.

Further, in the present exemplary embodiment, the estimation apparatus 100 generates the learning data for use in estimation parameter learning in advance and stores the generated learning data as the table 301 in the HDD 109. The estimation apparatus 100 prepares the learning data for use in estimation parameter learning to assist in realizing a mechanism of estimating the total number of objects even in a case where the target object is partly or entirely undetectable.

In the present exemplary embodiment, the number of detected targets is the number of target objects detected from an image. Alternatively, the number of detected targets can be, for example, the number of target objects detected visually by a person. In this case, the estimation apparatus 100 receives designation of the number of detected targets based on, for example, a user operation via the input apparatus 108.

Further, there may be a case where the target object is a person and a motion sensor is installed at a portion of a preset region. In this case, the estimation apparatus 100 can use the number of persons detected via the motion sensor as the number of detected targets and can use the persons who are actually in the region as the actual number. For example, the estimation apparatus 100 can learn an estimation parameter for use in estimating the actual number of persons in the region based on the feature amount of the region that is acquired from the number of detected targets based on combinations of the number of detected targets and the actual number at a plurality of time points in the region. Further, the estimation apparatus 100 can estimate the actual number of persons in the region at a designated time point using the learned estimation parameter. Further, the estimation apparatus 100 can calculate the combinations of the number of detected targets and the actual number at the plurality of time points in advance and can generate the learning data for use in estimation parameter learning.

<Example of Use>

An example of use of a system of presenting the number of target objects that is acquired by the processing of the estimation apparatus 100 according to the present exemplary embodiment and a crop yield that can be predicted based on the acquired number of target objects to a user will be described below. The system includes the estimation apparatus 100. The user of the system can utilize the number of target objects that is estimated by the estimation apparatus 100 in planning future work and processed product production. For example, the processing according to the present exemplary embodiment is suitably applicable to a case where grapes for wine production are cultivated. Production management of grapes for wine production will be described below as an example.

In cultivating grapes for wine production, accurate prediction of a yield of the grapes is demanded even during the cultivation of the grapes in order to manage the type and amount of wine producible in the year (also referred to as "vintage"). Thus, in grape fields, sprouts, flowers, and bunches of the grapes are counted at predetermined timings in a plurality of growth stages, and a final yield of the grapes of the year is repeatedly predicted. Then, in a case where the yield is lower or higher than the predicted value, the work in the field is changed, or a plan of the type and amount of wine to be produced or a sales plan is adjusted.

In order to count the actual number of target objects, persons (workers) visually count the target object while avoiding hindrances such as grape leaves. However, in a case where the field is large, counting all the trees in the field is excessively burdensome for the persons when timings of the counting are important.

Thus, sampling has been used to survey a plurality of regions of a field or a plurality of trees in a field. However, trees in a field that are tended similarly may grow differently depending on the location or year due to non-uniform geographical/climatic conditions. In order to conduct an accurate sampling survey factoring in the difference, sampling positions into which differences in geographical/climatic conditions in the field are incorporated is determined each time the survey is conducted.

Meanwhile, even in a case where a field is large, the workload of capturing images of grape trees across the entire field or in some regions under predetermined conditions is less than that of counting target objects while flipping leaves of all the trees. Even in a case where the actual number of target objects is counted only in a portion of the field, if a captured image of a region larger than the portion is acquired, the processing according to the present exemplary embodiment estimates the number of target objects with greater accuracy. As described above, in the present exemplary embodiment, the actual number of target objects in at least a portion of the field is estimated based on the captured image of the portion of the field using the learned model of a combination of a result of counting the actual number of target objects and the captured image. In this case, the learned model is learned to reflect the trend that the less the number of detected target objects in the image, the less the estimated actual number. Thus, even in a case where, for example, a tree is in a poorer growth state than another tree surveyed by sampling due to an effect of geographical conditions, the number of target objects that is estimated from the captured image of the tree is less than that of the other tree surveyed by sampling. Thus, the processing according to the present exemplary embodiment realizes accurate estimation processing regardless of positions at which a sampling survey is conducted.

Figure 19:
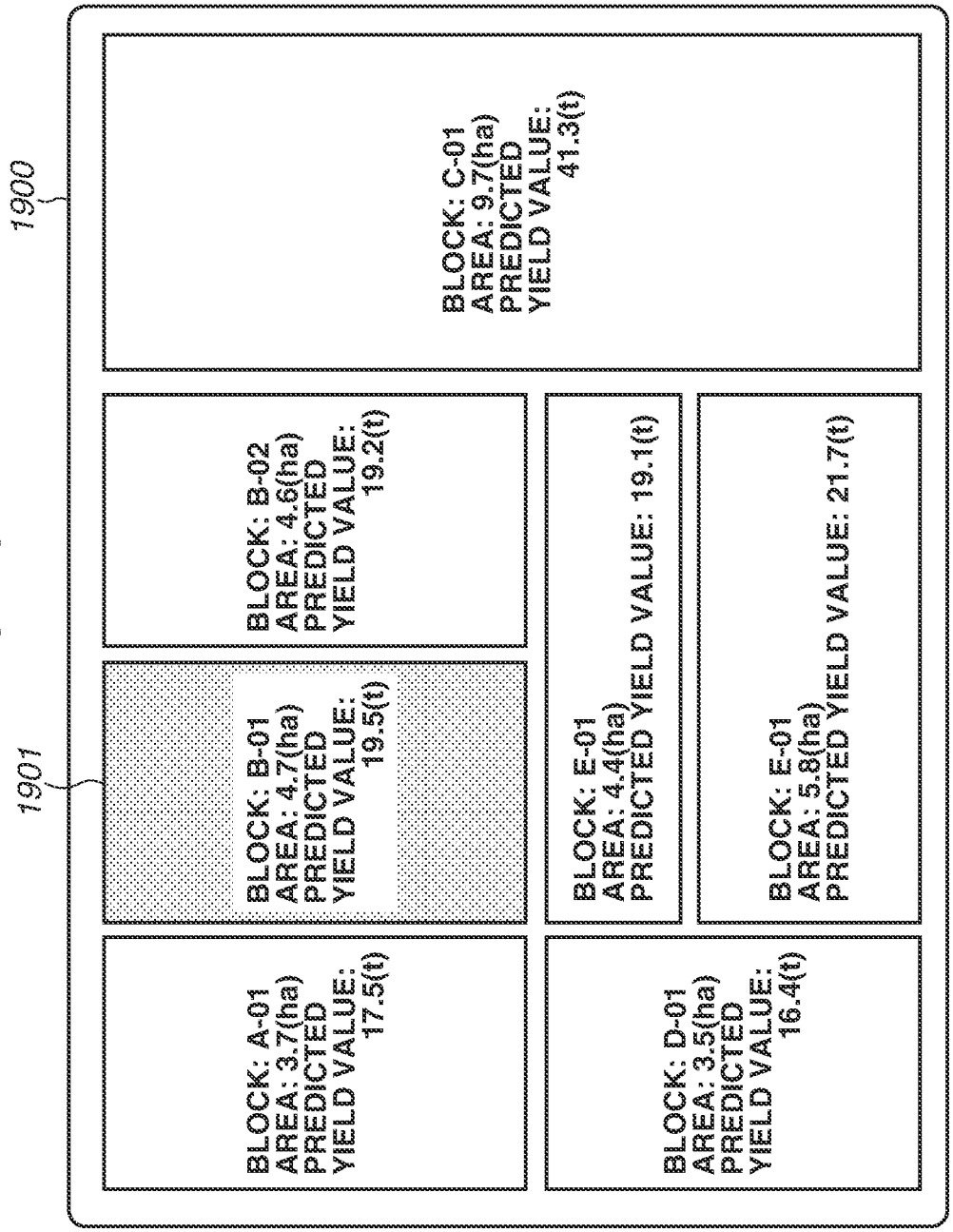
FIG. 19 is a diagram illustrating an example of an estimation result display screen.
Figure 20:
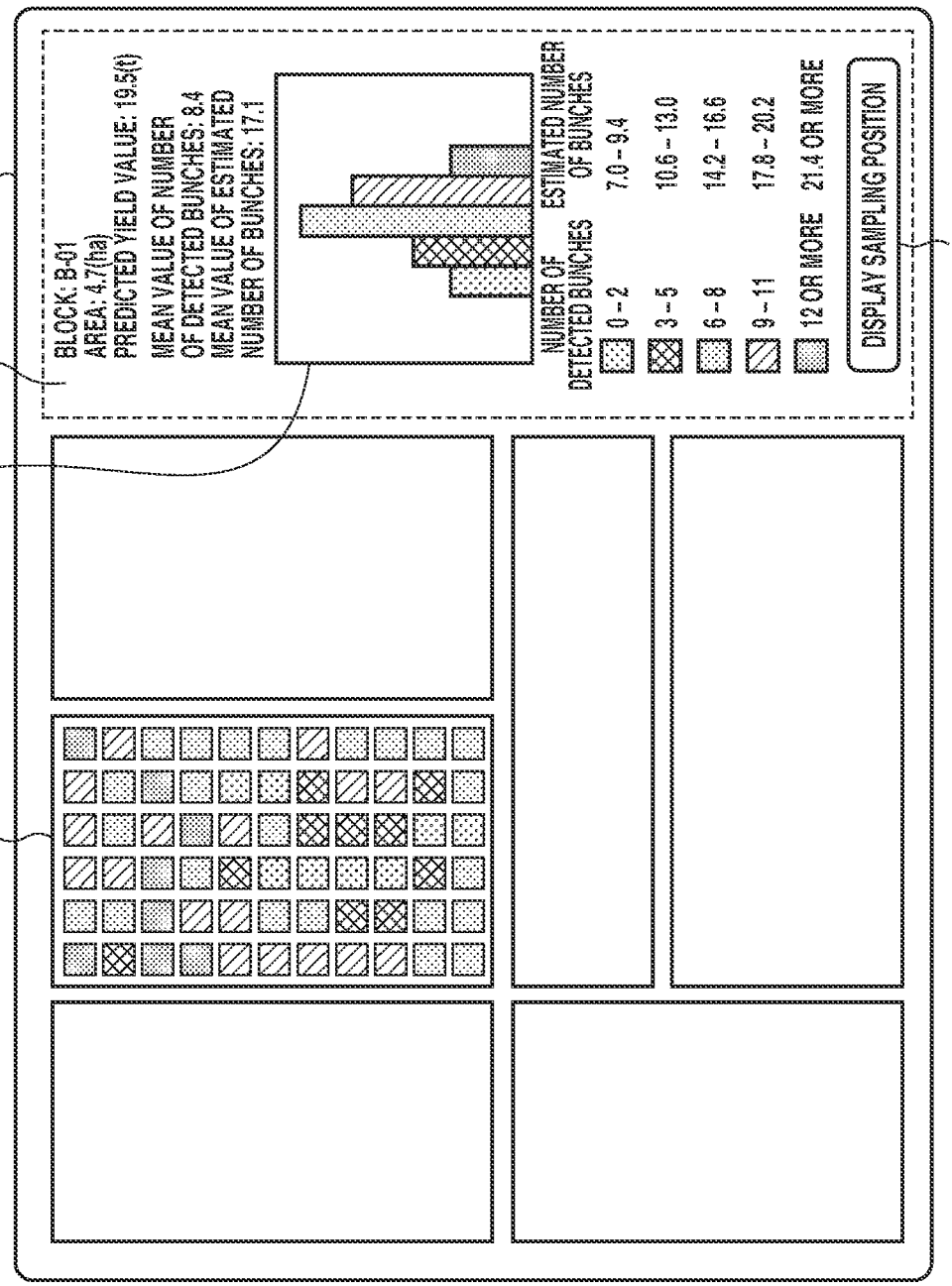
FIG. 20 is a diagram illustrating an example of an estimation result display screen.

FIGS. 19 to 21 are diagrams each illustrating an example of a display screen that displays an estimation result output from the estimation apparatus 100 in a case where the system according to the present example of use is introduced into a production site of grapes for wine production. In the present exemplary embodiment, the display control unit 207 generates a display screen in FIGS. 19 to 21 based on the result of the estimation in step S603 and displays the generated display screen on the display 106. Alternatively, the display control unit 207 can generate a display screen in FIGS. 19 to 21 based on the result of the estimation in step S603, transmit the generated display screen to an external device, and control a display unit (such as a display) of the transmission destination device to display the transmitted display screen.

A screen 1900 is a screen that displays an identifier (ID) and the area of each of seven blocks of a field and an estimated value of a grape yield of the associated block. The display control unit 207 calculates an estimated value of the weight (unit: t) of harvested grapes for every image of the associated block based on the total processing result in step S603 (the estimated number of bunches of harvested grapes). Then, the display control unit 207 includes the calculated weight as an estimated value of a grape yield in the screen 1900. The grape yield is specified by not the number of bunches but the weight to make it easier to use the grape yield in estimating the amount of wine production. In the example in FIG. 19, the value of 19.5 (t) is displayed as a predicted value of a grape yield in a block B-01 of a region 1901.

Further, in the present exemplary embodiment, if a pointing operation (e.g., a selection operation such as a click or tap) on the region 1901 via the input apparatus 108 is detected, the display control unit 207 changes the screen displayed on the display 106 to a screen 2000 illustrated in FIG. 20.

The screen 2000 displayed in a case where the region 1901 (corresponding to the block B-01) is selected on the screen 1900 will be described below with reference to FIG. 20. The screen 2000 is a screen that presents information based on which the predicted yield of the block B-01 is calculated.

The screen 2000 includes a region 2001 at a position corresponding to the region 1901 on the screen 1900. Sixty-six squares in the region 2001 are markers each indicating one unit of counting survey. In the example in FIG. 20, the target object is bunches of grapes. The pattern of each marker is a pattern corresponding to the mean value of the number of bunches detected in the unit. In other words, the region 2001 displays a geographical distribution of the number of detected target objects in the block B-01.

A region 2002 surrounded by a broken line displays detailed information about the selected block B-01. For example, the region 2002 displays information indicating that the mean value of the number of detected bunches of all the units of the block B-01 is 8.4. Further, the region 2002 displays information indicating that the mean value of the estimated number of bunches of all the units of the block B-01 is 17.1.

The number of target objects detected by the feature amount acquisition unit 204 does not include the number of target objects that are hindered by a hindrance from being detected. On the other hand, the actual number acquired by the number acquisition unit 201 includes the number of target objects that are hindered by a hindrance from being detected. Therefore, in the present exemplary embodiment, the actual number and the number of detected targets that are a pair of learning data may differ. Thus, there may be a case where the number of target objects that is estimated by the estimation unit 206 is greater by the number of target objects hindered by a hindrance from being detected than the number of detected targets as shown in the region 2002 in FIG. 20.

A region 2003 displays the total number of markers of each of a plurality of ranges into which the combinations of the number of detected bunches and the estimated number of bunches are divided. A representation form of the information displayed in the region 2003 can be a histogram form as in the example in FIG. 20 or a form of various graphs.

In the example in FIG. 20, the region 2003 displays a histogram with bins having different patterns for different ranges. The patterns of the bins of the histogram correspond to the patterns of the markers of the region 2001.

Further, in the example in FIG. 20, the patterns used in the regions 2003 and 2001 and the corresponding ranges of the number of detected bunches and the estimated number of bunches are displayed at a lower portion of the region 2002. While the display control unit 207 applies different patterns to the bins and the markers in the example in FIG. 20, different colors can be applied to the bins and the markers.

As described above, the region 2001 represents the distribution of the number of detected bunches in the form of a pseudo-heatmap. With the display in the heatmap form, a user can intuitively understand the magnitude and distribution of the number of detected targets.

Further, in the example in FIG. 20, the region 2002 displays the estimated number of bunches that is association with the number of detected bunches. A user who actually sees the field may have had seen the grape trees before the leaves grew and thus may intuitively recognize the number of bunches hidden by the leaves. Such a user may feel that the number of bunches detected from the image is less than the number that the user intuitively recognizes.

Thus, in the present example of use, the display control unit 207 displays not only the number of bunches that are actually detected but also the actual number estimated from the learned model in association with the number of detected targets as a basis for the predicted yield value. For example, the user first checks the screen 1900 and finds out the predicted yield value. Then, in a case where the user wishes to know the basis for the predicted value for confirmation in determining a future plan for each block, the user clicks the target block. Then, the user can check both the number of bunches detected from the image (the number of bunches that definitely exist in reality) and the estimated sum of bunches including those that are not detected from the image on the screen 2000 associated with the clicked block. For example, in a case where a user who knowns the actual state of the field feels that the predicted yield value on the screen 1900 is excessively small, the user can promptly determine whether this is because the number of detected targets is small or because the estimated number (estimation processing) is small, by checking the screen 2000.

A virtual button 2004 in the region 2002 is a button for use to input an instruction to specify a position at which the sampling survey is actually conducted among the markers in the region 2001. If a pointing operation on the virtual button 2004 is detected, the display control unit 207 changes the screen displayed on the display 106 to a screen 2100 in FIG. 21.

In the example in FIG. 21, the sixty-six markers of the block B-01 that are displayed on the screen 2000 are also displayed in the region 2001 of the screen 2100. Then, ten markers corresponding to the positions at which the sampling survey is actually conducted among the sixty-six markers are highlighted in bold, as specified by a marker 2101, by the display control unit 207.

At the same time, the display control unit 207 changes the display state of the virtual button 2004 on the screen 2000 by changing the color. This associates the display state of the virtual button 2004 with information about whether the virtual button 2004 is being selected. The user can determine whether the virtual button 2004 is in a selected state with ease by checking the virtual button 2004.

The function of the virtual button 2004 is effective especially in a case where the learning data based on the sampling survey of the year is used as a basis of the estimation processing. For example, in a case where the learned model that learns only data acquired as a previous record last year or before as learning data is used, the necessity to check the sampling positions is low, so that the virtual button 2004 can be omitted. For example, after a year in which adequate learning data is acquired from a previous record of a sampling survey, a yearly sampling survey can be omitted, and only a counting survey by the estimation processing according to the present exemplary embodiment can be conducted.

Second Exemplary Embodiment

In the present exemplary embodiment, a case where the estimation apparatus 100 identifies a region of a preset specific section and estimates the actual number of target objects in the identified region will be described below.

The estimation apparatus 100 according to the present exemplary embodiment has a hardware configuration similar to that in the first exemplary embodiment.

Differences from the first exemplary embodiment will be described below.

Figure 8:
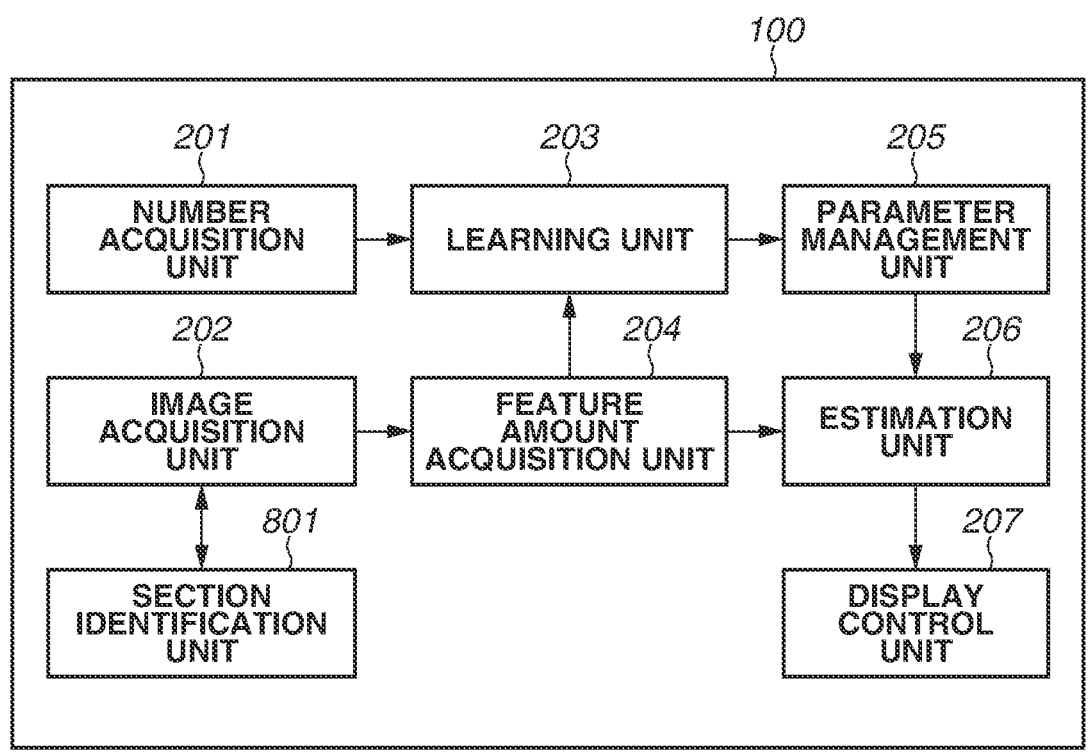
FIG. 8 is a diagram illustrating an example of a functional configuration of an estimation apparatus.

FIG. 8 is a diagram illustrating an example of a functional configuration of the estimation apparatus 100 according to the present exemplary embodiment. The estimation apparatus 100 according to the present exemplary embodiment is different from the first exemplary embodiment in FIG. 2 in that the estimation apparatus 100 includes a section identification unit 801 configured to identify the preset section region. Further, in the present exemplary embodiment, an image acquired by the image acquisition unit 202 is an image that specifies the preset section region.

The section identification unit 801 detects an object indicating the preset section region (e.g., a region of a section that is set to the field) from the image and identifies the section region in the image based on the position of the detected object. The image acquisition unit 202 cuts the section region identified by the section identification unit 801 from the input image and stores the cut section region in, for example, the HDD 109.

Figure 9:
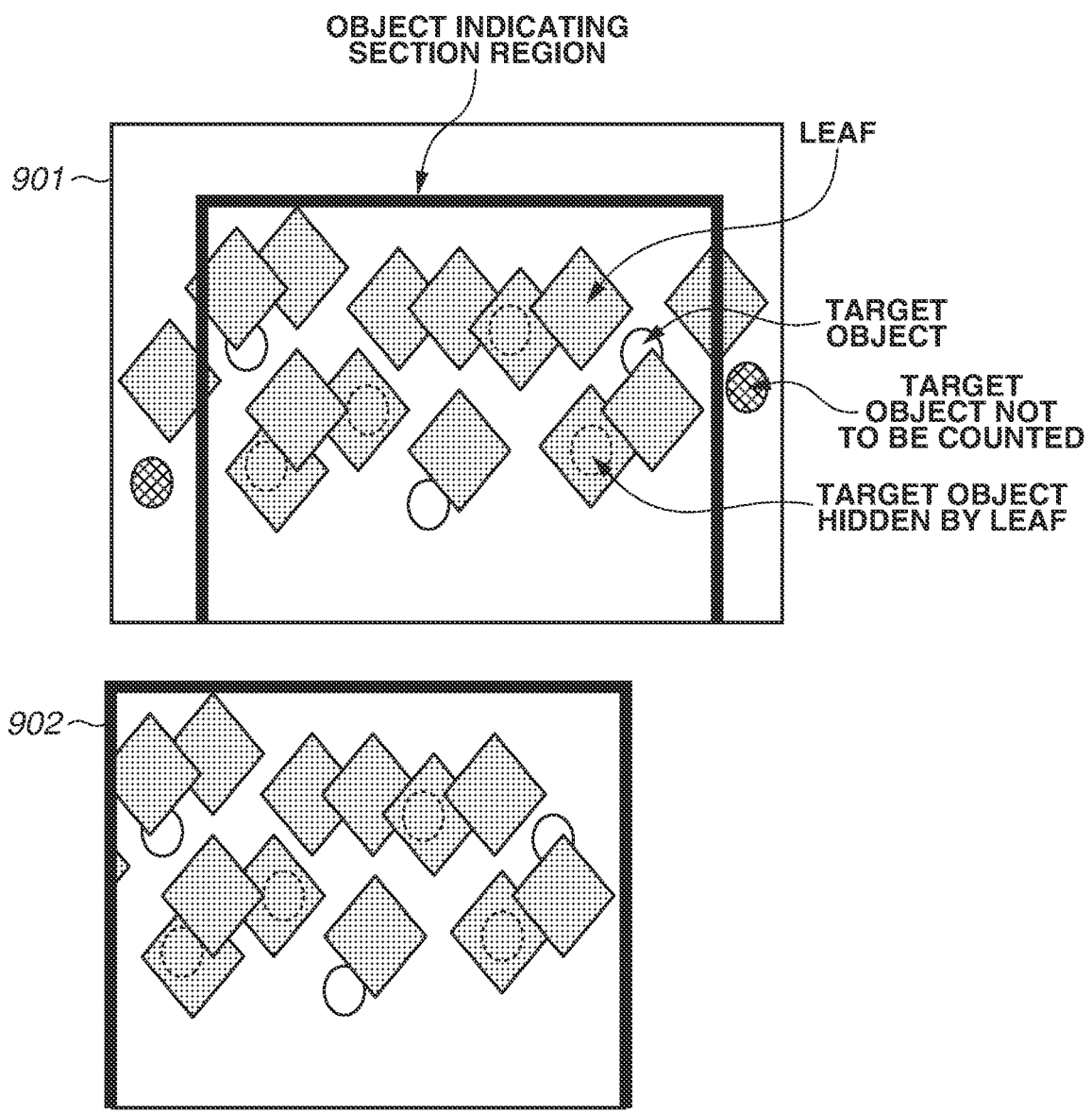
FIG. 9 is a diagram illustrating an example of a region of a section.

The processing of the section identification unit 801 will be described below with reference to FIG. 9. In FIG. 9, an image 901 is a captured image of a section region, and an image 902 is an image of a cut section region. The section identification unit 801 detects an object indicating a section region from the image 901 and identifies a region surrounded by the detected object in the image 901 as a section region. Then, the image acquisition unit 202 cuts the region identified by the section identification unit 801 from the image 901, acquires the image 902, and stores the acquired image 902 in the HDD 109.

Further, in a case where the section has a great width, the section may not fit in a single image, and the single section is captured in a plurality of images in which the single section is divided. In this case, the section identification unit 801 arranges the plurality of captured images of the section, detects objects that respectively indicate ends of the section from the plurality of images, and identifies a section region in each image. The image acquisition unit 202 combines the section regions identified in the plurality of images by the section identification unit 801 and stores the combined image in the HDD 109.

Figure 10:
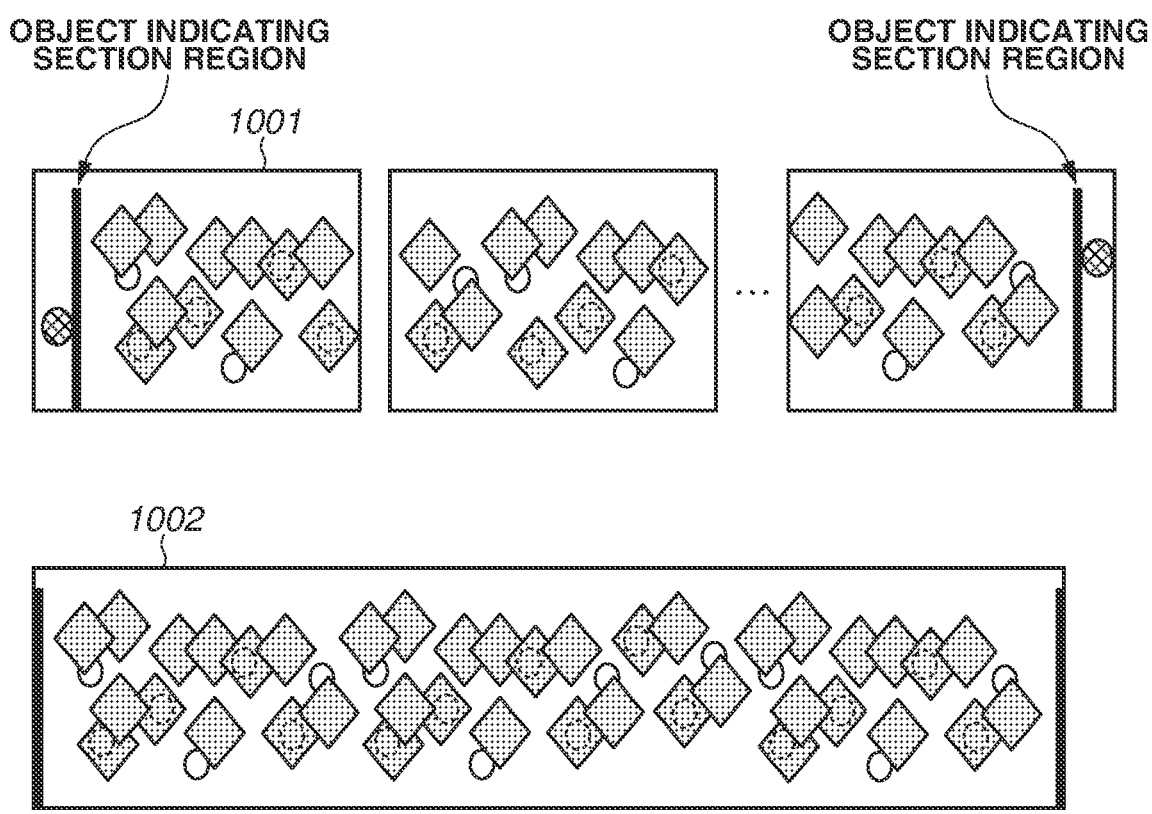
FIG. 10 is a diagram illustrating an example of a region of a section.

The processing of the section identification unit 801 in this case will be described below with reference to FIG. 10. In FIG. 10, a plurality of images 1001 is a captured image of the section region, and an image 1002 is an image of the combined section regions. The section identification unit 801 detects an object indicating the section region from the plurality of images 1001 and identifies a region between the objects detected from the plurality of images 1001 as a section region. Then, the image acquisition unit 202 combines the regions identified from the images 1001 by the section identification unit 801, acquires the image 1002, and stores the acquired image 1002 in the HDD 109.

The section identification unit 801 can combine a plurality of captured images of the section into a single combined image, detect the object indicating the section region from the combined image, and identify the section region in the combined image based on the detected object.

In the present exemplary embodiment, the feature amount acquisition unit 204 detects the target object from a captured image of the preset section region identified by the section identification unit 801 that is acquired by the image acquisition unit 202. Then, the feature amount acquisition unit 204 acquires a feature amount of the section region based on the number of detected target objects (the number of detected targets).

Thus, each feature amount contained in the learning data for use in estimation parameter learning and each feature amount for use in estimation processing are a feature amount of one of the preset sections. Specifically, in the present exemplary embodiment, an estimation parameter is learned for each section defined in the field.

Further, the image acquisition unit 202 can acquire an image similar to that in the first exemplary embodiment without acquiring an image of the section region identified by the section identification unit 801. In this case, the feature amount acquisition unit 204 detects the target object from the preset section region identified by the section identification unit 801 in the image acquired by the image acquisition unit 202. Then, the feature amount acquisition unit 204 acquires the feature amount of the section region based on the number of detected target objects (the number of detected targets).

As described above, in the present exemplary embodiment, the estimation apparatus 100 identifies the preset section region and estimates the actual number of target objects in the identified section region.

In a case where the actual number of target objects in a section region is to be estimated, it is desirable to reduce effects of target objects that may be detected from regions other than the section region. With the processing according to the present exemplary embodiment, the estimation apparatus 100 reduces effects of target objects that may be detected from regions other than a region that is a target of the estimation of the actual number of target objects.

Further, while the section identification unit 801 identifies the section region by detecting the object indicating the preset section region, the section region can be identified by measuring a distance using position information, such as Global Positioning System (GPS) data, and an image measurement technique. Further, the estimation apparatus 100 can display a virtual frame on a camera finder that generates an input image so that the user can check the identified section region during image capturing, or the estimation apparatus 100 can generate a combined image with a frame superimposed thereon. Further, the estimation apparatus 100 can store frame information as metadata on images in, for example, the HDD 109.

Third Exemplary Embodiment

In the present exemplary embodiment, a case where the estimation apparatus 100 acquires a feature amount indicating a feature of a region based on another attribute of the region in addition to the number of target objects detected from the region will be described below.

The estimation apparatus 100 according to the present exemplary embodiment has a hardware configuration and a functional configuration that are similar to those in the first exemplary embodiment.

In the present exemplary embodiment, the estimation apparatus 100 uses a combination of the number of target objects detected from a region and another attribute of the region as a feature amount of the region. Then, the estimation apparatus 100 learns an estimation parameter using the feature amount and estimates the number of target objects using the estimation parameter.

A table 1101 in FIG. 11 is a table for use in registering learning data. The table 1101 is stored in, for example, the HDD 109. The table 1101 is a table that contains information for use in estimation parameter learning in addition to the table 301 illustrated in FIG. 3.

The table 1101 contains items "ID", "image file", "number of detected targets", "number of detected targets in neighborhoods", "soil", "amount of leaves", and "actual number". The item "number of detected targets in neighborhoods" is the mean value of target objects detected from one or more regions neighboring the region specified by the associated ID. In the present exemplary embodiment, the target object is a crop. In the present exemplary embodiment, the estimation apparatus 100 includes a feature (e.g., a statistical value (e.g., mean, total, variance) determined based on the number of features of target objects detected from the neighboring regions) of the regions neighboring the region in the feature amount of the region. This enables the estimation apparatus 100 to learn an estimation parameter with which the actual number of target objects is estimated while factoring in the neighboring regions, and the estimation apparatus 100 can estimate the actual number of target objects using the estimation parameter while factoring in the neighboring regions.

The item "soil" is an index value indicating the fertility (productiveness) of a soil of the region specified by the associated ID. A greater index value indicates a better soil. In the present exemplary embodiment, the estimation apparatus 100 includes the index value indicating the fertility of the soil in which the crop being the target object is planted in the feature amount. This enables the estimation apparatus 100 to learn an estimation parameter with which the actual number of target objects is estimated while factoring in the feature of the soils, and the estimation apparatus 100 can estimate the actual number of target objects using the estimation parameter while factoring in the feature of the soil.

The item "amount of leaves" is an index value indicating the amount of leaves detected from the region. A greater index value indicates a greater amount of leaves. In the present exemplary embodiment, a possible hindrance to detection of the target object is a leaf. In the present exemplary embodiment, the estimation apparatus 100 includes the amount of detected hindrances in the feature amount. This enables the estimation apparatus 100 to learn an estimation parameter for estimating the actual number of target objects while factoring in the amount of hindrances, and the estimation apparatus 100 can estimate the actual number of target objects while factoring in the amount of hindrances using the estimation parameter.

In the present exemplary embodiment, the feature amount of the region is a combination of the number of detected targets, the number of detected targets in neighborhoods, the amount of leaves, and the index value that indicates the fertility of the soil. Alternatively, the feature amount of the region can be a combination of some of the number of detected targets, the number of detected targets in neighborhoods, the amount of leaves, and the index value that indicates the fertility of the soil. Further, the feature amount of the region can include an attribute of the region other than the number of detected targets, the number of detected targets in neighborhoods, the amount of leaves, and the index value that indicates the fertility of the soil.

A table 1201 in FIG. 12 is a table that manages the feature amount of a region for which the actual number of target objects is to be estimated and the value of the actual number of target objects in the region that is estimated by the estimation unit 206. The table 1201 is a table that contains information for use in estimating the actual number of target objects in addition to the table 401 in FIG. 5. The table 1201 contains items "ID", "image file", "number of detected targets", "number of detected targets in neighborhoods", "soil", "amount of leaves", and "estimated value". The items "number of detected targets in neighborhoods", "soil", and "amount of leaves" are similar to those in the table 1101.

Figure 13:
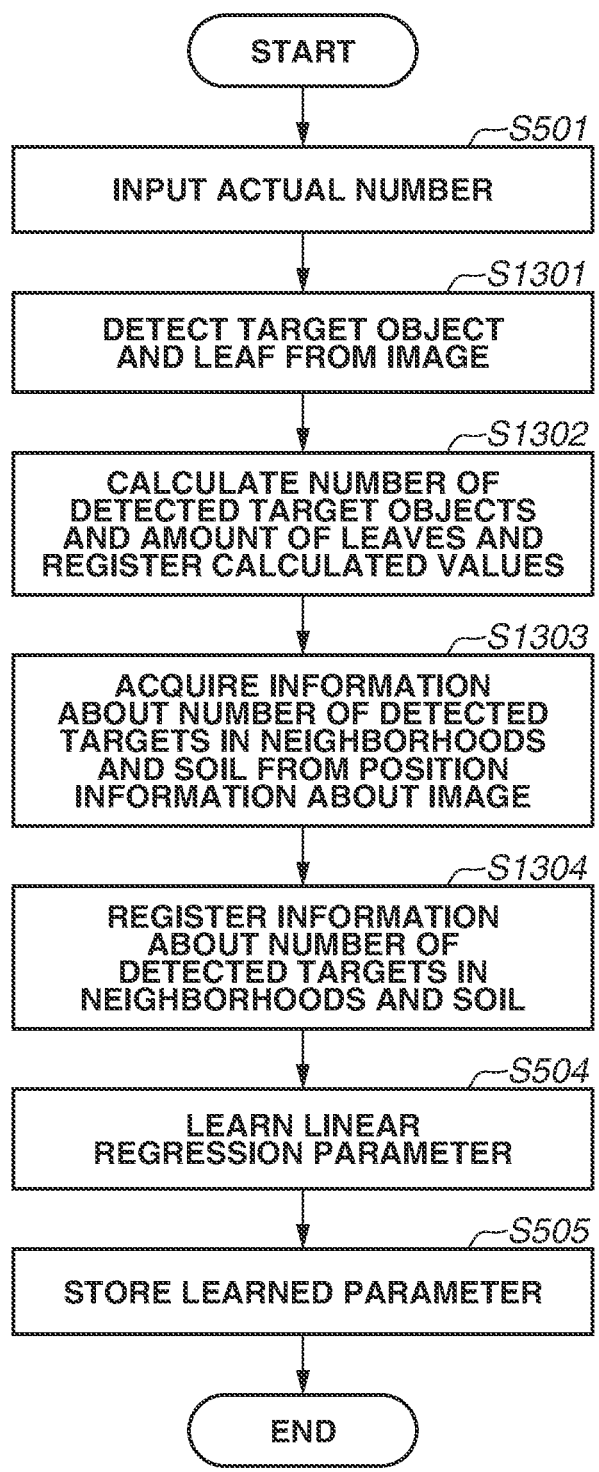
FIG. 13 is a flowchart illustrating an example of a learning process.

FIG. 13 is a flowchart illustrating an example of a process of learning an estimation parameter. The process in FIG. 13 is different from the process in FIG. 6 in that not the table 301 but the table 1101 is used.

Steps S1301 to S1304 are the processing of acquiring the feature amount of each image file registered in the table 1101 by the feature amount acquisition unit 204 and registering the acquired feature amount.

In step S1301, the feature amount acquisition unit 204 detects the target object and the leaf from the image registered in the table 1101. The feature amount acquisition unit 204 can detect the leaf by using an object detection technique or by simply detecting each pixel having the color of the leaf.

In step S1302, the feature amount acquisition unit 204 registers the number of target objects detected in step S1301 and the amount of leaves in the table 1101. The feature amount acquisition unit 204 acquires the amount of leaves that is the index value indicating the amount of leaves based on the ratio between the number of pixels of the region of the detected leaves and the number of pixels of the entire image.

In step S1303, the feature amount acquisition unit 204 acquires position information, such as GPS data, from the metadata on the image registered in the table 1101. Then, the feature amount acquisition unit 204 acquires information about the number of detected targets in neighborhoods and the fertility of the soil based on the acquired position information. The feature amount acquisition unit 204 acquires position information about the images associated with the previous and subsequent IDs of the ID of the target ID from the table 1101 and determines whether the images are images of neighboring regions. Then, the feature amount acquisition unit 204 acquires the number of detected targets of each image determined as a neighboring region and acquires the mean value of the acquired numbers as the number of detected targets in neighborhoods. For example, the feature amount acquisition unit 204 averages the values of 3 and 4 of the number of detected targets of the IDs 1 and 3, respectively, to obtain the value of 3.5 and determines the obtained value of 3.5 as the number of detected targets in neighborhoods of the ID 2.

In the present exemplary embodiment, images that are captured positionally consecutively are registered as images of consecutive IDs in the table 1101. Thus, it is presumed that images of close IDs are images captured at close positions. However, in a case where an image of an end of an image capturing target region is captured, the image capturing may be disrupted, and images of consecutive IDs may not neighbor. Thus, the feature amount acquisition unit 204 determines whether the regions actually neighbor using the position information.

Further, in order to overcome a case where images of close IDs may not be close in position as a result that the images are simultaneously captured at a plurality of positions, the estimation apparatus 100 can be configured as follows. Specifically, the table 1101 contains position information about the region of the associated ID, and the feature amount acquisition unit 204 identifies data on the number of detected targets of each region neighboring a region, from the table 1101 based on the position information.

Information indicating a relationship between the position and the fertility of the soil that is empirically acquired from previous growth states is managed in a database stored in, for example, the HDD 109. The feature amount acquisition unit 204, for example, acquires an index value indicating the fertility of the soil that is associated with the image capturing position form the database and the like.

In step S1304, the feature amount acquisition unit 204 registers the information about the number of detected targets in neighborhoods and the index value of the fertility of the soil that is acquired in step S1303 in the table 1101.

In step S504 in FIG. 13, the learning unit 203 learns an estimation parameter using the number of detected targets, the number of detected targets in neighborhoods, the index value indicating the fertility of the soil, and the amount of leaves in the table 1101. In the present exemplary embodiment, the estimation parameter is a linear regression parameter. The linear regression is expressed by, for example, the following formula (2):

$$\text{Actual number(estimated value)} = w0 + (w1 \times \text{the number of detected targets}) + (w2 \times \text{the number of detected targets in neighborhoods}) + (w3 \times \text{the index value indicating the fertility of the soil}) + (w4 \times \text{the amount of leaves}) \quad \text{formula (2).}$$

In this case, the learning unit 203 learns w0, w1, w2, w3, and w4 as estimation parameters. For example, values such as w0=7.0, w1=0.7, w2=0.5, w3=1.6, and w4=1.2 are learned.

In step S505 in FIG. 13, the parameter management unit 205 stores the estimation parameters learned in step S504 in, for example, the HDD 109 and manages the stored estimation parameters.

Figure 14:
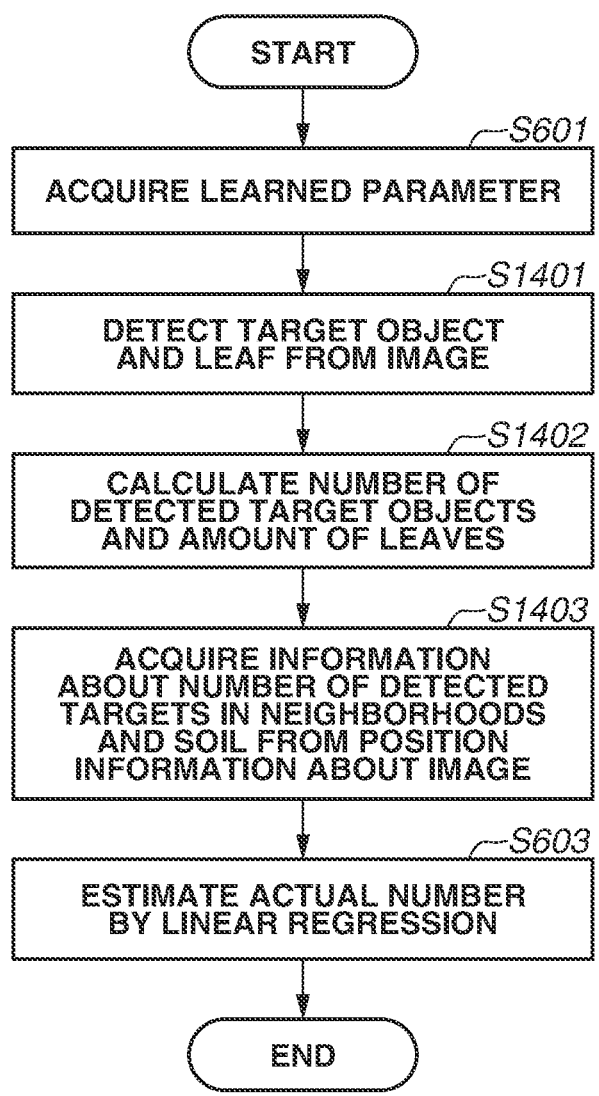
FIG. 14 is a flowchart illustrating an example of an estimation process.

FIG. 14 is a flowchart illustrating an example of a process of estimating the actual number of target objects using the estimation parameters learned in the process in FIG. 13.

In step S601 in FIG. 14, the estimation unit 206 acquires the estimation parameters learned in step S504 in FIG. 13.

In step S1401, as in step S1301, the feature amount acquisition unit 204 detects the target object and the leaf from the captured image of the region that is a target of the estimation of the actual number of target objects.

In step S1402, as in step S1302, the feature amount acquisition unit 204 registers the number of target objects detected in step S1401 and the amount of leaves in the table 1201. The feature amount acquisition unit 204 acquires the amount of leaves that is the index value indicating the amount of leaves based on the ratio between the number of pixels of the region of the detected leaves and the number of pixels of the entire image.

In step S1403, as in step S1303, the feature amount acquisition unit 204 acquires position information, such as GPS data, from the metadata on the captured image of the region that is a target of the estimation of the actual number of target objects. Then, the feature amount acquisition unit 204 acquires information about the number of detected targets in neighborhoods and the fertility of the soil based on the acquired position information. Then, the feature amount acquisition unit 204 registers the acquired information about the number of detected targets in neighborhoods and the index value indicating the fertility of the soil in the table 1201.

In step S603 in FIG. 14, the estimation unit 206 performs the following processing using formula (2) based on the estimation parameters acquired in step S601 and the feature amount of the region that is registered in the table 1201. Specifically, the estimation unit 206 estimates the actual number of target objects in the region that is a target of the estimation of the actual number of target objects.

In the example in FIG. 12, the number of detected target objects (the number of detected targets) of an ID 836 is less than those of IDs 835 and 837. However, the estimated value of the ID 836 is about the same as those of the IDs 835 and 837. Thus, the number of target objects hidden by leaves in the region of the ID 836 may merely be greater than those of the IDs 835 and 837, and the number of detected targets in the region of the ID 836 may merely be less than those of the IDs 835 and 837.

Even in the same field, there are regions where crops grow well and there are other regions where crops do not grow well, and it is assumed that there is a correlation between the actual numbers of target objects of those that are close in position. The estimation apparatus 100 can complement information about the number of detected targets using the number of detected targets in neighborhoods as a feature amount, so that even in a case where the number of detected targets decreases, the estimated value is prevented from becoming excessively small. Further, as the amount of leaves increases, the possibility that the target object is hidden increases. Thus, the estimation apparatus 100 uses the amount of leaves as a feature amount to prevent the estimated value from becoming excessively small even in a case where the amount of leaves is great and many objects are hidden.

As described above, in the present exemplary embodiment, the estimation apparatus 100 uses other attributes of the region, such as the positional non-uniformity of productiveness (the fertility of the soil) and the amount of leaves, as a feature amount in addition to the number of detected targets. This enables the estimation apparatus 100 to estimate the actual number of target objects more accurately than the first exemplary embodiment.

Besides the feature amount used in the present exemplary embodiment, the estimation apparatus 100 can use information about the size of the target object that is detected based on the assumption that the target object in a productive region has a large size, as a feature amount of the region. The estimation apparatus 100 can also use a crop type that is considered as a factor of productiveness, fertilizer spreading state, and the presence or absence of diseases as a feature amount.

Fourth Exemplary Embodiment

The productiveness of a crop varies depending on the weather. In the present exemplary embodiment, a description will be given of the processing of estimating the actual number of a crop that is the target object and correcting the estimated number while factoring in a weather condition.

The estimation apparatus 100 according to the present exemplary embodiment has a hardware configuration similar to that in the first exemplary embodiment.

Differences between the present exemplary embodiment and the first exemplary embodiment will be described below.

Figure 15:
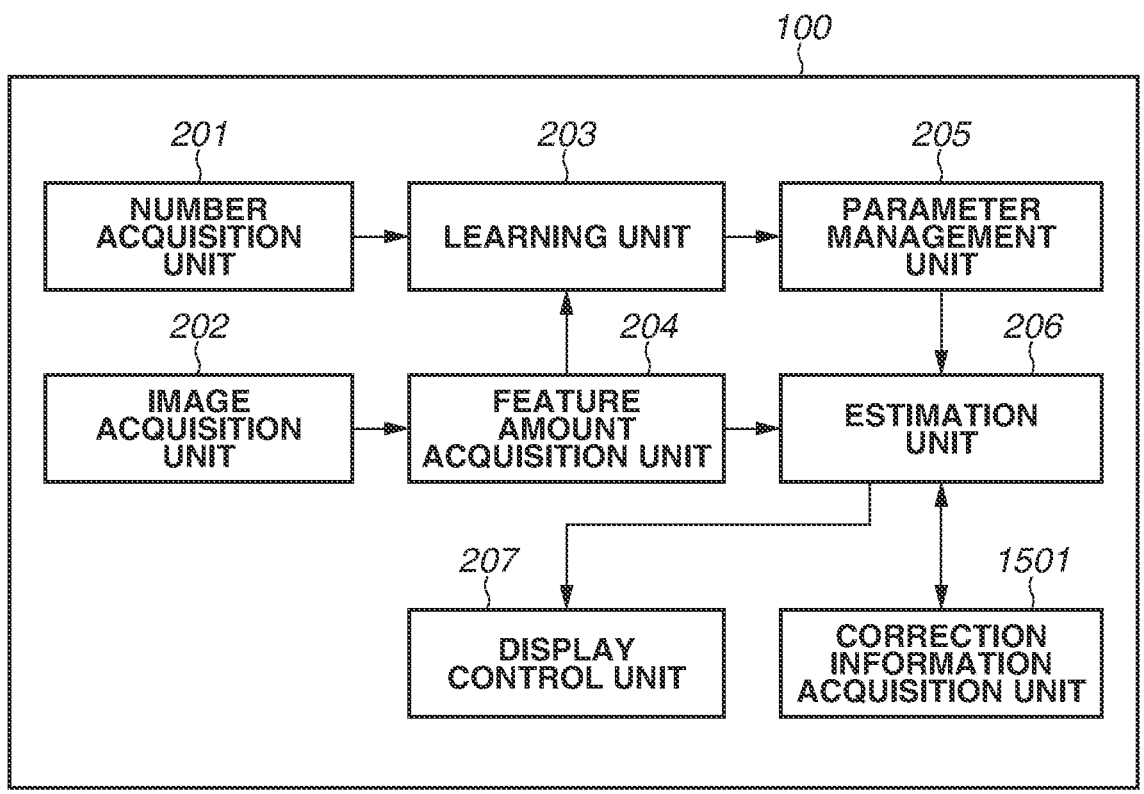
FIG. 15 is a diagram illustrating an example of a functional configuration of an estimation apparatus.

FIG. 15 is a diagram illustrating an example of a functional configuration of the estimation apparatus 100 according to the present exemplary embodiment. The functional configuration of the estimation apparatus 100 according to the present exemplary embodiment is different from the functional configuration in FIG. 2 in that a correction information acquisition unit 1501 configured to acquire correction information is included. The correction information acquisition unit 1501 acquires a learned estimation parameter for use in estimating the actual number of target objects by the estimation unit 206 and correction information (e.g., coefficients by which estimated values are to be multiplied) that is information for use in correcting estimated values. In the present exemplary embodiment, the estimation unit 206 estimates the actual number of target objects using the estimation parameter and the correction information.

FIG. 16 is a diagram illustrating an example of a table that manages the learned parameters and the coefficients that are prepared in advance. A table 1601 contains items "year", "mean value of the number of detected targets", and "parameter". The item "year" is the year associated with the learning data registered in the table 301. The item "mean value of the number of detected targets" is the mean value of the number of detected targets in the associated year. The item "parameter" is the estimation parameter learned by the learning unit 203 using the learning data associated with the year. The table 1601 is a table that manages a plurality of estimation parameters learned by the learning unit 203 and each associated with an index value of a preset index that is the mean value of the number of detected targets. The table 1601 is stored in, for example, the HDD 109.

A table 1602 contains items "proportion of sunny days" and "coefficient". The item "proportion of sunny days" is the proportion of sunny days during a period of growth of a crop that is the target object in a region. The item "coefficient" is a value for correcting an estimated value, and the coefficient value increases with increase in the associated proportion of sunny days.

Figure 17:
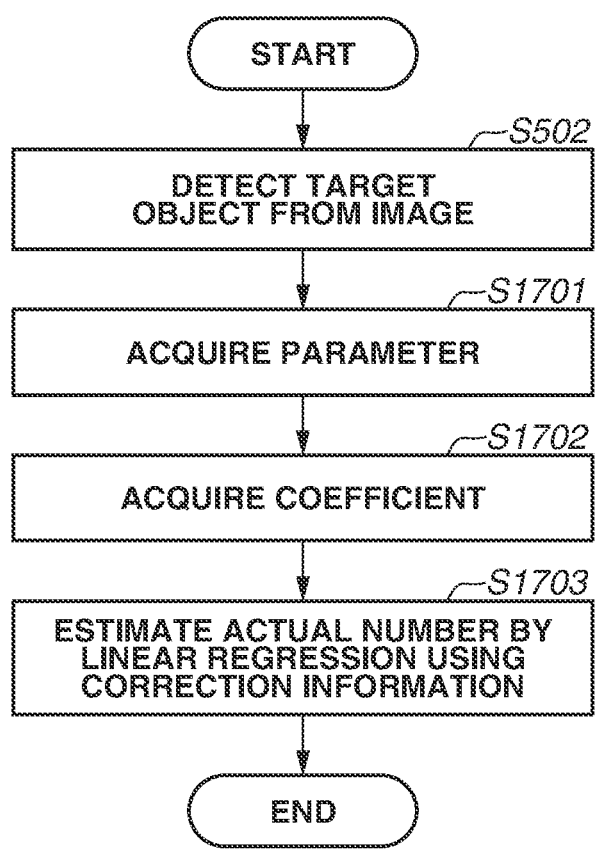
FIG. 17 is a flowchart illustrating an example of an estimation process.

FIG. 17 is a flowchart illustrating an example of an estimation process using the estimation parameter.

In step S1701, the correction information acquisition unit 1501 averages the number of detected targets in the table 401 and acquires the mean value of the number of detected targets in the year associated with the target of the estimation of the actual number of target objects. The correction information acquisition unit 1501 acquires the estimation parameter associated with the value of the mean value of the number of detected targets that is the closest value to the acquired mean value of the number of detected targets from the estimation parameters registered in the table 1601. The correction information acquisition unit 1501 selects the acquired estimation parameter as an estimation parameter for use in estimation processing.

By the processing in step S701, the estimation apparatus 100 acquires the estimation parameter learned under a condition close to the condition in which the estimation target region is situated without re-learning the estimation parameter. Thus, the estimation apparatus 100 can prevent a decrease in estimation processing accuracy while the burden of the learning processing is reduced.

In step S1702, the correction information acquisition unit 1501 acquires the proportion of sunny days during the growth period of the crop that is a target object in the year associated with the estimation target region based on weather information acquired using, for example, an external meteorological service. The correction information acquisition unit 1501 acquires the coefficient associated with the acquired proportion of sunny days from the table 1602.

In step S1703, the estimation unit 206 acquires the estimated value of the actual number of target objects based on formula (1) using, for example, the estimation parameter selected in step S1701. Then, the estimation unit 206 multiplies the acquired estimated value by the coefficient acquired in step S1702 to correct the estimated value and determines the corrected estimated value as a final estimated value.

As described above, in the present exemplary embodiment, the estimation apparatus 100 acquires the coefficient for use in correcting the estimated value of the object based on the weather information (the proportion of sunny days). Then, the estimation apparatus 100 corrects the estimated value of the actual number of target objects using the acquired coefficient. Thus, the estimation apparatus 100 acquires a more accurate estimated value of the actual number of target objects than those in the first exemplary embodiment.

While the crop is harvested once a year in the present exemplary embodiment, a harvest is not limited to once a year, and a crop that is harvested a plurality of times in a year can be set as a target. In this case, data management can be changed from yearly management to management on a growth period basis.

While the estimation apparatus 100 uses the proportion of sunny days to acquire the coefficient in the present exemplary embodiment, the estimation apparatus 100 can also use mean values and integrated values of daylight hours, precipitation, and temperatures.

The estimation apparatus 100 can use the mean value of the number of detected targets for use in acquiring the estimation parameter described in the present exemplary embodiment and the proportion of sunny days for use in acquiring the correction information as a feature amount. Further, the estimation apparatus 100 can acquire the estimation parameter and the correction information using some of the feature amounts described in the third exemplary embodiment.

Fifth Exemplary Embodiment

In the first exemplary embodiment, the estimation apparatus 100 generates learning data for use in estimation parameter learning, learns an estimation parameter, and estimates the actual number of target objects. The processes, however, do not have to be performed by a single apparatus.

In the present exemplary embodiment, a description will be given of a case where the processing of generating learning data for use in estimation parameter learning, the processing of learning an estimation parameter, and the processing of estimating the actual number of target objects are respectively performed by separate apparatuses.

Figure 18:
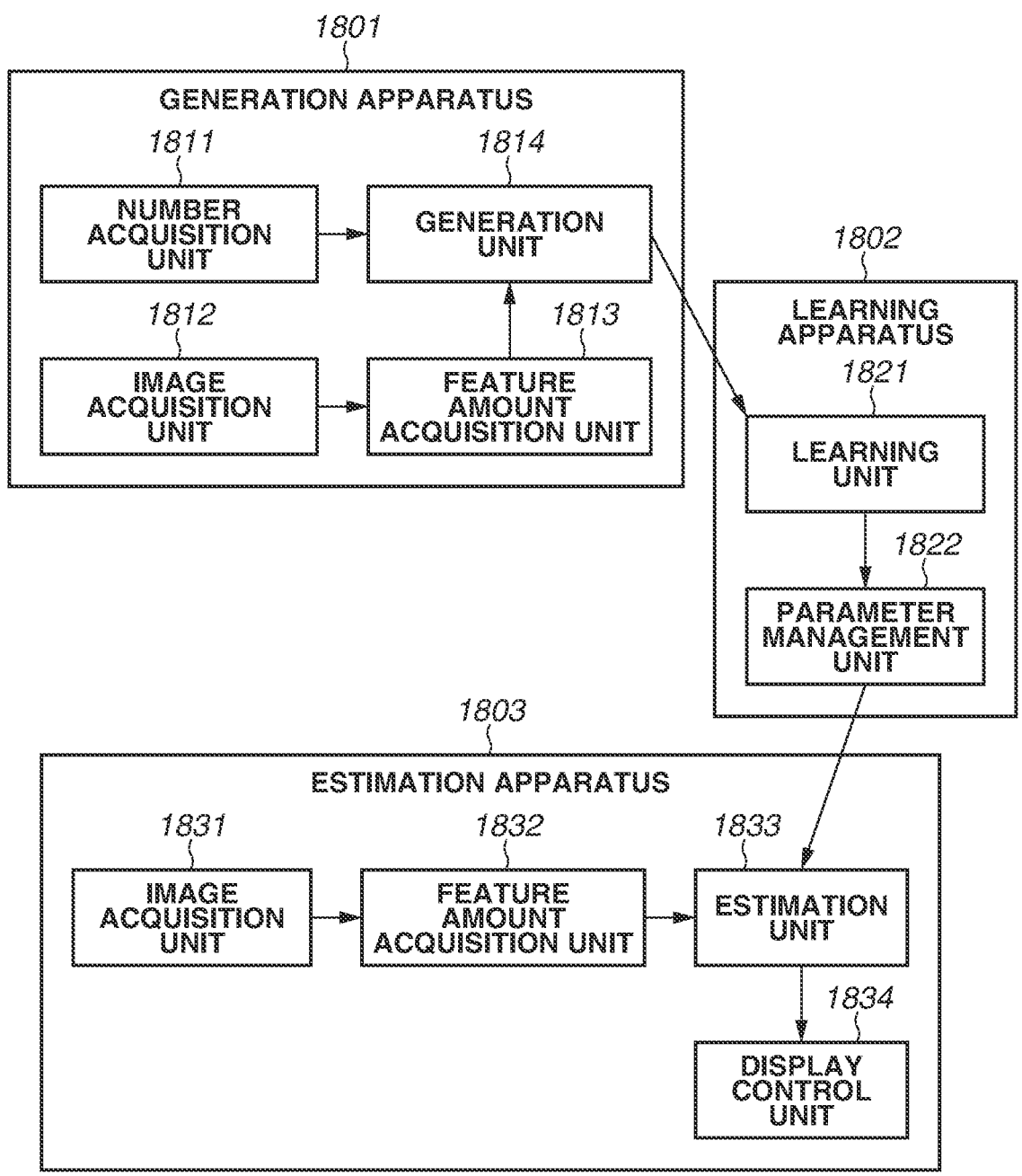
FIG. 18 is a diagram illustrating an example of a system configuration of an information processing system.

FIG. 18 is a diagram illustrating an example of a system configuration of an information processing system that generates learning data for use in estimation parameter learning, learns an estimation parameter, and estimates the actual number of target objects in the present exemplary embodiment.

The information processing system includes a generation apparatus 1801, a learning apparatus 1802, and an estimation apparatus 1803. The generation apparatus 1801, the learning apparatus 1802, and the estimation apparatus 1803 each have a hardware configuration similar to the hardware configuration of the estimation apparatus 100 in FIG. 1 according to the first exemplary embodiment.

A CPU of the generation apparatus 1801 performs processing based on a program stored in a ROM or HDD of the generation apparatus 1801 to realize functions and processing of the generation apparatus 1801 in FIG. 18. A CPU of the learning apparatus 1802 performs processing based on a program stored in a ROM or HDD of the learning apparatus 1802 to realize functions and processing of the learning apparatus 1802 in FIG. 18. A CPU of the estimation apparatus 1803 performs processing based on a program stored in a ROM or HDD of the estimation apparatus 1803 to realize functions and processing of the estimation apparatus 1803 in FIG. 18.

Functional configurations of the generation apparatus 1801, the learning apparatus 1802, and the estimation apparatus 1803 will be described below.

The generation apparatus 1801 includes a number acquisition unit 1811, an image acquisition unit 1812, a feature amount acquisition unit 1813, and a generation unit 1814. The number acquisition unit 1811, the image acquisition unit 1812, and the feature amount acquisition unit 1813 are similar to the number acquisition unit 201, the image acquisition unit 202, and the feature amount acquisition unit 204 in FIG. 2, respectively. The generation unit 1814 generates learning data and stores the generated learning data in the form of the table 301 or CSV in the HDD of the generation apparatus 1801. The generation unit 1814 generates learning data by, for example, performing processing similar to steps S501 to S503 in FIG. 6.

The learning apparatus 1802 includes a learning unit 1821 and a parameter management unit 1822. The learning unit 1821 and the parameter management unit 1822 are functional components that are respectively similar to the learning unit 203 and the parameter management unit 205 in FIG. 2. Specifically, the learning unit 1821 acquires the learning data generated by the generation apparatus 1801 from the generation apparatus 1801 and learns an estimation parameter by performing processing similar to steps S504 and S505 in FIG. 6 based on the acquired learning data (information in the table 301). Then, the parameter management unit 1822 stores the estimation parameter learned by the learning unit 1821 in the HDD of the learning apparatus 1802.

The estimation apparatus 1803 includes an image acquisition unit 1831, a feature amount acquisition unit 1832, an estimation unit 1833, and a display control unit 1834. The image acquisition unit 1831, the feature amount acquisition unit 1832, the estimation unit 1833, and the display control unit 1834 are similar to the image acquisition unit 202, the feature amount acquisition unit 204, the estimation unit 206, and the display control unit 207 in FIG. 2, respectively. Specifically, the image acquisition unit 1831, the feature amount acquisition unit 1832, and the estimation unit 1833 perform processing similar to those in FIG. 7 to estimate the actual number of target objects in the region that is a target of the estimation of the number of target objects.

As described above, in the present exemplary embodiment, the processing of generating learning data for use in estimation parameter learning, the processing of learning an estimation parameter, and the processing of estimating the actual number of target objects are respectively performed by separate apparatuses. This divides the burden of the processing to the plurality of apparatuses.

Other Exemplary Embodiments

The present invention is also realized by the following processing. Specifically, a program that realizes one or more functions of the above-described exemplary embodiments is fed to a system or apparatus via a network or storage medium, and one or more processors of a computer of the system or apparatus read the program and execute the read program. Further, the present invention is also realized by a circuit (e.g., application-specific integrated circuit (e.g., ASIC) that realizes one or more functions.

For example, portion of the functional configuration of the estimation apparatus 100 or the entire functional configuration can be implemented as hardware to the estimation apparatus 100, the generation apparatus 1801, the learning apparatus 1802, and the estimation apparatus 1803.

While an example of exemplary embodiments of the present invention is described in detail above, the present invention is not limited to the specific exemplary embodiments. For example, the above-described exemplary embodiments can be combined as desired.

The present invention is not limited to the above-described exemplary embodiments, and various changes and modifications can be made without departing from the spirit and scope of the present invention. The following claims are attached to disclose the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention assists in realizing a mechanism of estimating the total number of objects even in a case where an object to be counted is partly or entirely undetectable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. An information processing apparatus comprising:
a memory storing instructions; and
at least one processor executing the instructions causing the information processing apparatus to:
detect a number of target objects from a captured image of a crop, a resolution of the captured image being such that the number of the target objects is detectable by object detection or visual observation;
estimate the number of target objects in a region corresponding to the image, based on information about a soil in which the crop is grown, information about a type of the crop, weather information, and information about an amount of leaves in the image as estimation parameters, and the number of target objects detected;
display information on the number of target objects estimated and the number of target objects detected for a plurality of units among a field of the crop; and
display, in accordance with a user operation, a unit among the plurality of units where a sampling survey has been conducted by manually counting the number of the target object,
wherein the number of target objects detected from the captured image, the number of target objects estimated and the unit where the sampling survey has been conducted are displayed together on a user interface.

2. The information processing apparatus according to claim 1, wherein the target object is at least one of a sprout, fruit, flower, and bunch of the crop.

3. The information processing apparatus according to claim 1, wherein the at least one processor further executes the instructions causing the information processing apparatus to display a yield of the crop that is predicted, based on the number of target objects that is estimated, on a predetermined display.

4. The information processing apparatus according to claim 3, wherein the at least one processor further controls the predetermined display to display the number of target objects detected from a predetermined range based on which the yield of the crop is predicted and the number of target objects that is estimated, in accordance with a user operation.

5. The information processing apparatus according to claim 1, wherein the at least one processor further executes the instructions causing the information processing apparatus to generate learning data for use in learning the estimation parameter, based on the number of target objects detected and the actual number of target objects.

6. The information processing apparatus according to claim 1, wherein the at least one processor further controls the predetermined display to display stepwise divided combinations of the number of target objects detected and the number of target objects that is estimated.

7. The information processing apparatus according to claim 1, wherein the at least one processor further controls the predetermined display to display a virtual button for use to input an instruction to specify a position at which sampling survey is actually conducted.

8. An information processing method comprising:
detecting a number of target objects from a captured image of a crop, a resolution of the captured image being such that the number of the target objects is detectable by object detection or visual observation;
estimating the number of target objects in a region corresponding to the image, based on information about a soil in which the crop is grown, information about a type of the crop, weather information, and information about an amount of leaves in the image as estimation parameters, and the detected number of target objects;
displaying information on the number of target objects estimated and the number of target objects detected for a plurality of units among a field of the crop; and displaying, in accordance with a user operation, a unit among the plurality of units where a sampling survey has been conducted by manually counting the number of the target object, wherein the number of target objects detected from the captured image, the number of target objects estimated and the unit where the sampling survey has been conducted are displayed together on a user interface.

9. A non-transitory computer-readable storage medium that stores a program for causing a computer to execute an information processing method comprising:

detecting a number of target objects from a captured image of a crop, a resolution of the captured image being such that the number of the target objects is detectable by object detection or visual observation;

estimating the number of target objects in a region corresponding to the image, based on information about a soil in which the crop is grown, information about a type of the crop, weather information, and information about an amount of leaves in the image as estimation parameters, and the number of target objects detected;

displaying information on the number of target objects estimated and the number of target objects detected for a plurality of units among a field of the crop; and displaying, in accordance with a user operation, a unit among the plurality of units where a sampling survey has been conducted by manually counting the number of the target object, wherein the number of target objects detected from the captured image, the number of target objects estimated and the unit where the sampling survey has been conducted are displayed together on a user interface.

* * * * *